US012670241B2

(12) United States Patent
Lee et al.

(10) Patent No.: US 12,670,241 B2
(45) Date of Patent: Jun. 30, 2026

(54) METHOD FOR PERFORMING AUTHENTICATION USING FINGERPRINT SENSOR AND ELECTRONIC DEVICE SUPPORTING THE SAME

(71) Applicant: Samsung Electronics Co., Ltd., Suwon-si (KR)

(72) Inventors: Hyungmin Lee, Suwon-si (KR); Jihye Park, Suwon-si (KR); Soohyun Seo, Suwon-si (KR); Joohoon Eom, Suwon-si (KR); Heetak Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 18/829,616

(22) Filed: Sep. 10, 2024

(65) Prior Publication Data

US 2025/0139214 A1    May 1, 2025

Related U.S. Application Data

(63) Continuation of application No. PCT/KR2024/013544, filed on Sep. 6, 2024.

(30) Foreign Application Priority Data

Oct. 31, 2023    (KR) ........................ 10-2023-0147313
Dec. 4, 2023    (KR) ........................ 10-2023-0173805

(51) Int. Cl.
G06F 21/32        (2013.01)
G06F 1/16        (2006.01)
(Continued)

(52) U.S. Cl.
CPC ............ G06F 21/32 (2013.01); G06F 1/1624 (2013.01); G06F 21/44 (2013.01); G06V 40/1306 (2022.01); G06V 40/1365 (2022.01)

(58) Field of Classification Search
CPC ........ G06F 21/32; G06F 1/1624; G06F 21/44; G06F 1/1652; G06V 40/1306; G06V 40/1365; H04M 1/02
(Continued)

(56) References Cited

U.S. PATENT DOCUMENTS 8,788,838 B1 * 7/2014 Fadell ................. H04L 63/0861
                                                    713/186
10,102,411 B2 * 10/2018 Lillie ................. G06V 40/1306
(Continued)

FOREIGN PATENT DOCUMENTS

JP        2022-036337 A        3/2022
KR    10-2021-0084805 A        7/2021
(Continued)

OTHER PUBLICATIONS

KR202110084805A, Lee et al.; a method for restoring distortion video based on finger print recognition, English translation, (Jul. 8, 2021) (Year: 2021).*
(Continued)

*Primary Examiner* — Nam V Nguyen
(74) *Attorney, Agent, or Firm* — Jefferson IP Law, LLP

(57) ABSTRACT

An electronic device is provided. The electronic device includes a first housing, a second housing configured to slidably move relative to the first housing, a display, wherein a display area of the display, which is exposed to an outside of the electronic device, can be extended or reduced based on a sliding movement of the second housing, a fingerprint sensor configured to be moved by the sliding movement of the second housing, at least one processor including processing circuitry, and memory storing instructions. The instructions, when executed by the at least one processor individually or collectively, cause the electronic device to, based on a touch area touched by the user on the display (Continued)

corresponding to a first area corresponding to the fingerprint sensor in the display, perform an authentication using the fingerprint sensor, based on the touch area not corresponding to the first area, control the sliding movement of the second housing so that the first area is located at a position where the authentication can be performed, and perform the authentication, based on the sliding movement of the second housing.

20 Claims, 20 Drawing Sheets

(51) Int. Cl.
| | | |
|---|---|---|
| *G06F 21/44* | (2013.01) | |
| *G06V 40/12* | (2022.01) | |
| *G06V 40/13* | (2022.01) | |

(58) Field of Classification Search
USPC ........................................................ 340/5.52
See application file for complete search history.

(56) References Cited

U.S. PATENT DOCUMENTS

| | | | | |
|---|---|---|---|---|
| 10,262,184 B2 * | 4/2019 | Roh | ........................ | G06F 3/0412 |
| 10,452,178 B2 * | 10/2019 | Cho | ........................ | G06F 3/0487 |
| 10,846,505 B2 * | 11/2020 | Seol | ........................ | H04M 1/724 |
| 11,036,954 B2 * | 6/2021 | Lee | ........................ | G06V 10/17 |
| 12,300,039 B2 * | 5/2025 | Park | ........................ | G06F 3/041 |
| 2009/0083850 A1 | 3/2009 | Fadell et al. | | |
| 2014/0230049 A1 | 8/2014 | Fadell et al. | | |
| 2015/0146945 A1 | 5/2015 | Han et al. | | |
| 2019/0373171 A1 * | 12/2019 | Inaba | ................. | G06V 40/1318 |
| 2021/0133422 A1 * | 5/2021 | Lee | ........................ | G06F 1/1684 |
| 2021/0385311 A1 | 12/2021 | Kim et al. | | |
| 2022/0147178 A1 | 5/2022 | Kim et al. | | |
| 2022/0385750 A1 | 12/2022 | Kim et al. | | |
| 2023/0072841 A1 | 3/2023 | Baek et al. | | |
| 2023/0196821 A1 | 6/2023 | Kim | | |
| 2023/0259169 A1 | 8/2023 | Shim et al. | | |

FOREIGN PATENT DOCUMENTS

| | | | |
|---|---|---|---|
| KR | 10-2021-0151654 A | 12/2021 | |
| KR | 10-2022-0084083 A | 6/2022 | |
| KR | 10-2023-0050047 A | 4/2023 | |
| KR | 10-2023-0141378 A | 10/2023 | |
| WO | 2023/191320 A1 | 10/2023 | |

OTHER PUBLICATIONS

KR20210151654A; Kim et al. an electronic device including a plurality of displays and method for operating thereof; (Dec. 14, 2021) (Year: 2021).*

KR20230050047A; Kim Junghyung; an electronic device including fingerprint sensor; (Apr. 14, 2023 (Year: 2023).*

International Search Report dated Dec. 12, 2024, issued in an International Application No. PCT/KR2024/013544.

* cited by examiner 1511     1513     1515     1517     1519     1521     1523     1525     1527     1529

1512     1514     1516     1518     1520     1522     1524     1526     1528     1530

METHOD FOR PERFORMING AUTHENTICATION USING FINGERPRINT SENSOR AND ELECTRONIC DEVICE SUPPORTING THE SAME

CROSS-REFERENCE TO RELATED APPLICATION(S)

This application is a continuation application, claiming priority under § 365 (c), of an International application No. PCT/KR2024/013544, filed on Sep. 6, 2024, which is based on and claims the benefit of a Korean patent application number 10-2023-0147313, filed on Oct. 31, 2023, in the Korean Intellectual Property Office, and of a Korean patent application number 10-2023-0173805, filed on Dec. 4, 2023, in the Korean Intellectual Property Office, the disclosure of each of which is incorporated by reference herein in its entirety.

TECHNICAL FIELD

The disclosure relates to a method for performing authentication using a fingerprint sensor and an electronic device supporting the same.

BACKGROUND ART

Various biometric authentication technologies may be applied to electronic devices. Among various biometric authentication technologies, the most commonly used biometric authentication technology may be fingerprint authentication technology. An electronic device may include a display module (e.g., a touch screen) capable of detecting a touch by a finger or the like. The fingerprint of a finger may be obtained using a fingerprint sensor disposed at a position corresponding to at least a partial area of the display module of the electronic device, and authentication of the user may be performed based on information about the obtained fingerprint.

Recently, development of flexible displays is booming and flourishes. A flexible display may be mounted on an electronic device in a form that is slidable, foldable or bendable, or rollable. An electronic device including a flexible display may provide an extended or contracted screen according to the user's need.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

An electronic device may display an image for guiding a user to an area capable of sensing a fingerprint on a display. The electronic device may perform fingerprint authentication based on a fingerprint input by the user's touch to the area. In contrast, the electronic device may fail to perform fingerprint authentication when a touch is input to an area other than the area on the display.

Aspects of the disclosure are to address at least the above-mentioned problems and/or disadvantages and to provide at least the advantages described below. Accordingly, an aspect of the disclosure is to provide a method for performing authentication using a fingerprint sensor and an electronic device supporting the same, which may perform fingerprint authentication (and fingerprint registration) even by the user's touch on an area on the display, capable of sensing fingerprint by the fingerprint sensor by moving a portion of the electronic device (e.g., an electronic device including a rollable display), as well as the area on the display capable of sensing fingerprint by the fingerprint sensor.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing configured to slidably move relative to the first housing, a display, wherein a display area of the display, which is exposed to an outside of the electronic device, can be extended or reduced based on a sliding movement of the second housing, a fingerprint sensor configured to be moved by the sliding movement of the second housing, at least one processor including processing circuitry, and memory storing instructions. The instructions, when executed by the at least one processor individually or collectively, cause the electronic device to, based on a touch area touched by the user on the display corresponding to a first area corresponding to the fingerprint sensor in the display, perform an authentication using the fingerprint sensor, based on the touch area not corresponding to the first area, control the sliding movement of the second housing so that the first area is located at a position where the authentication can be performed, and perform the authentication, based on the sliding movement of the second housing.

In accordance with another aspect of the disclosure, a method for performing authentication using a fingerprint sensor in an electronic device is provided. The method includes performing authentication using a fingerprint sensor based on a touch area touched by a user on a display of the electronic device corresponding to a first area corresponding to the fingerprint sensor in the display, the electronic device comprising a first housing, a second housing configured to slidably move relative to the first housing, the display, and the fingerprint sensor configured to be moved by a sliding movement of the second housing, wherein a display area of the display, which is exposed to an outside of the electronic device, can be extended or reduced based on a sliding movement of the second housing, based on the touch area not corresponding to the first area, controlling the sliding movement of the second housing so that the first area is located at a position where the authentication can be performed, and performing the authentication, based on the sliding movement of the second housing.

In accordance with another aspect of the disclosure, in a non-transitory computer-readable medium storing computer-executable instructions, the computer-executable instructions may, when executed, cause an electronic device including at least one processor to perform authentication using a fingerprint sensor based on a touch area touched by a user on a display of the electronic device corresponding to a first area corresponding to the fingerprint sensor in the display, the electronic device comprising a first housing, a second housing configured to slidably move relative to the first housing, the display, and the fingerprint sensor configured to be moved by a sliding movement of the second housing, wherein a display area of the display, which is exposed to an outside of the electronic device, can be extended or reduced based on a sliding movement of the second housing, control the sliding movement of the second housing so that the first area is located at a position where the authentication can be performed, and perform the authentication based on the sliding movement of the second housing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Figure 1:
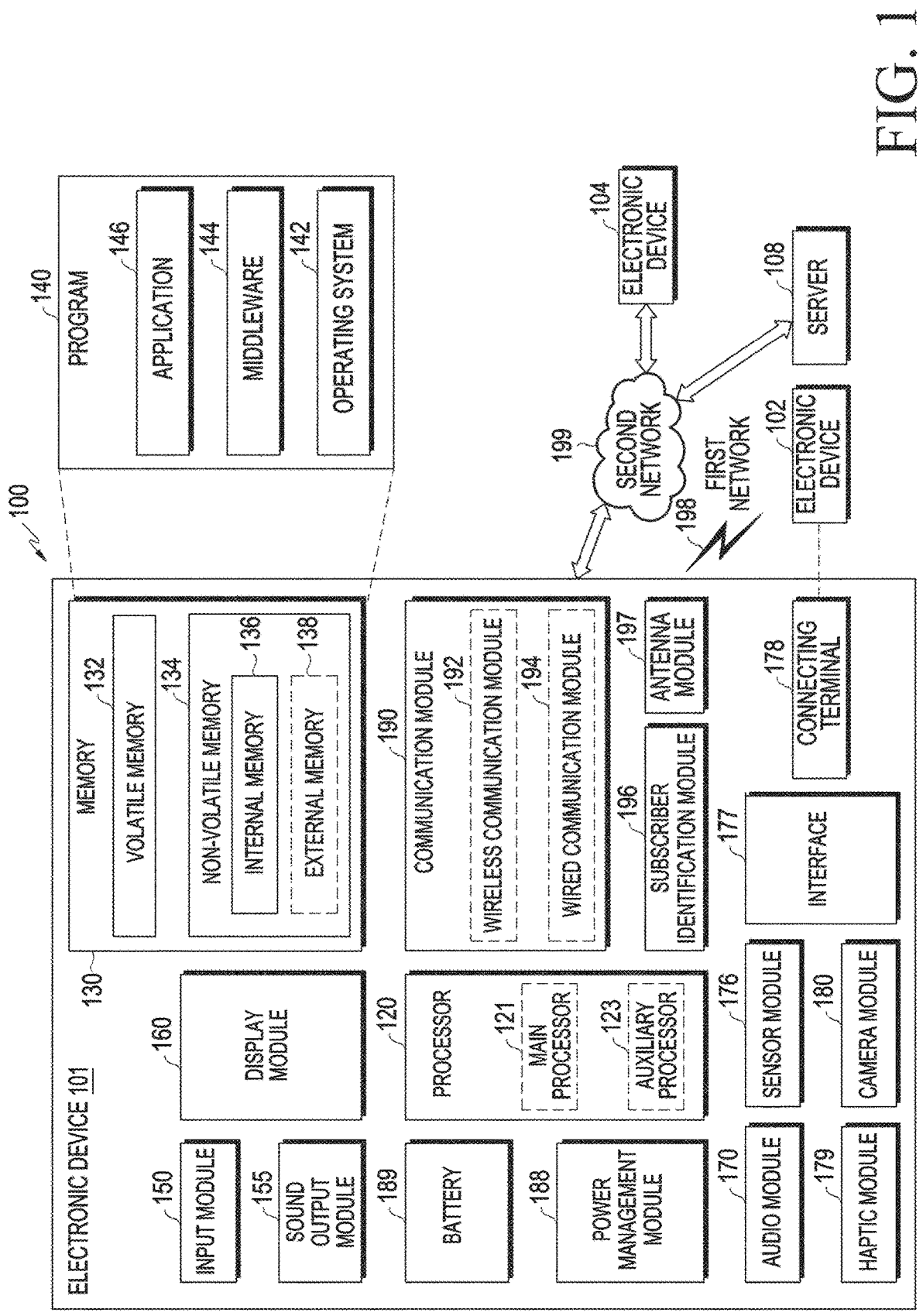
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, an electronic device 101 in a network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductor or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102 and 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment of the disclosure, each component (e.g., a module or a program) of the above-described components may include a single entity or multiple entities. Some of the plurality of entities may be separately disposed in different components. According to an embodiment of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2:
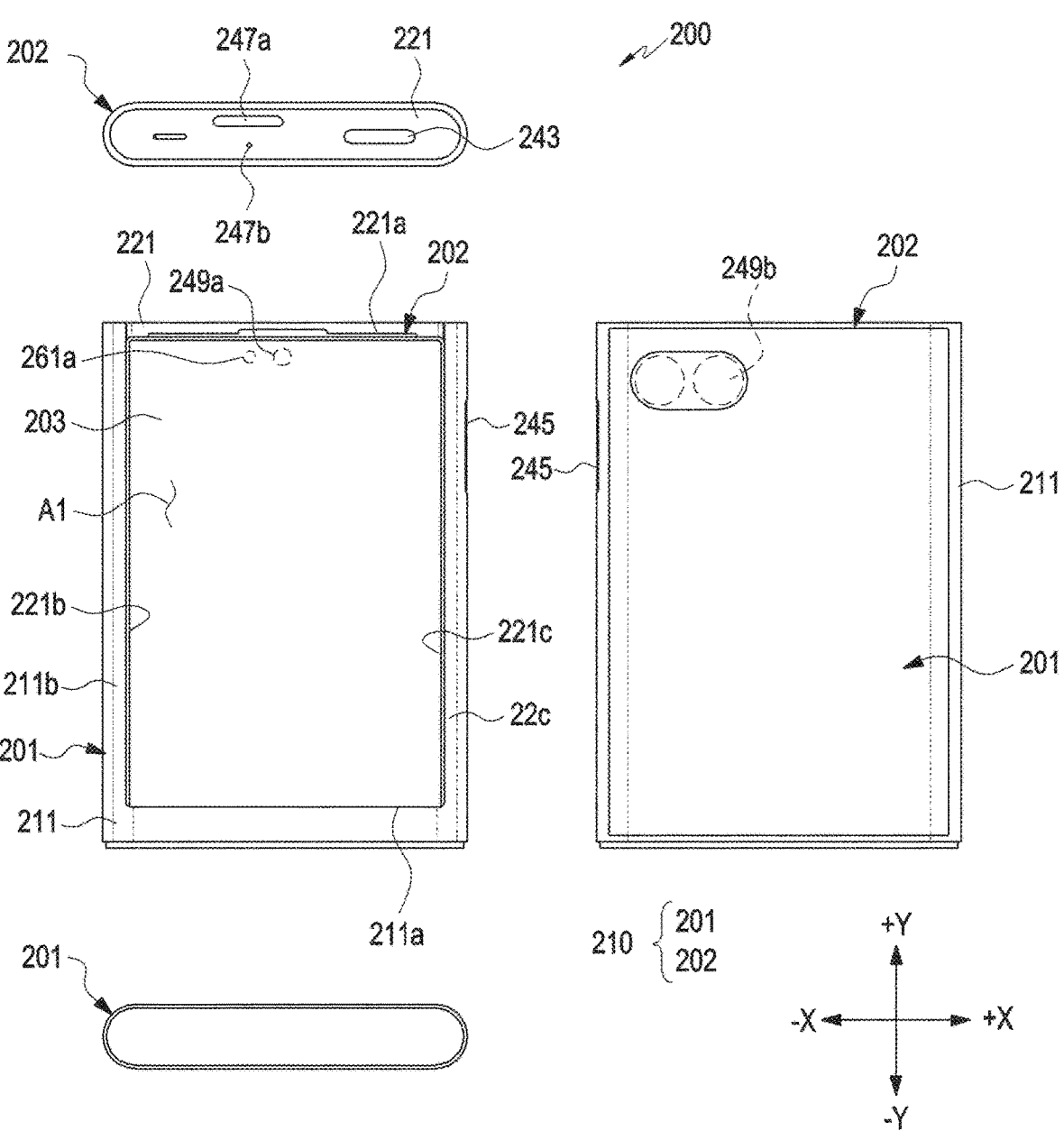
FIG. 2 is a view illustrating a state in which a second display area of a display is received in a housing according to an embodiment of the disclosure.

FIG. 2 is a view illustrating a state in which a second display area (e.g., the display area A2 of FIG. 3) of a display is received in a housing according to an embodiment of the disclosure.

Figure 3:
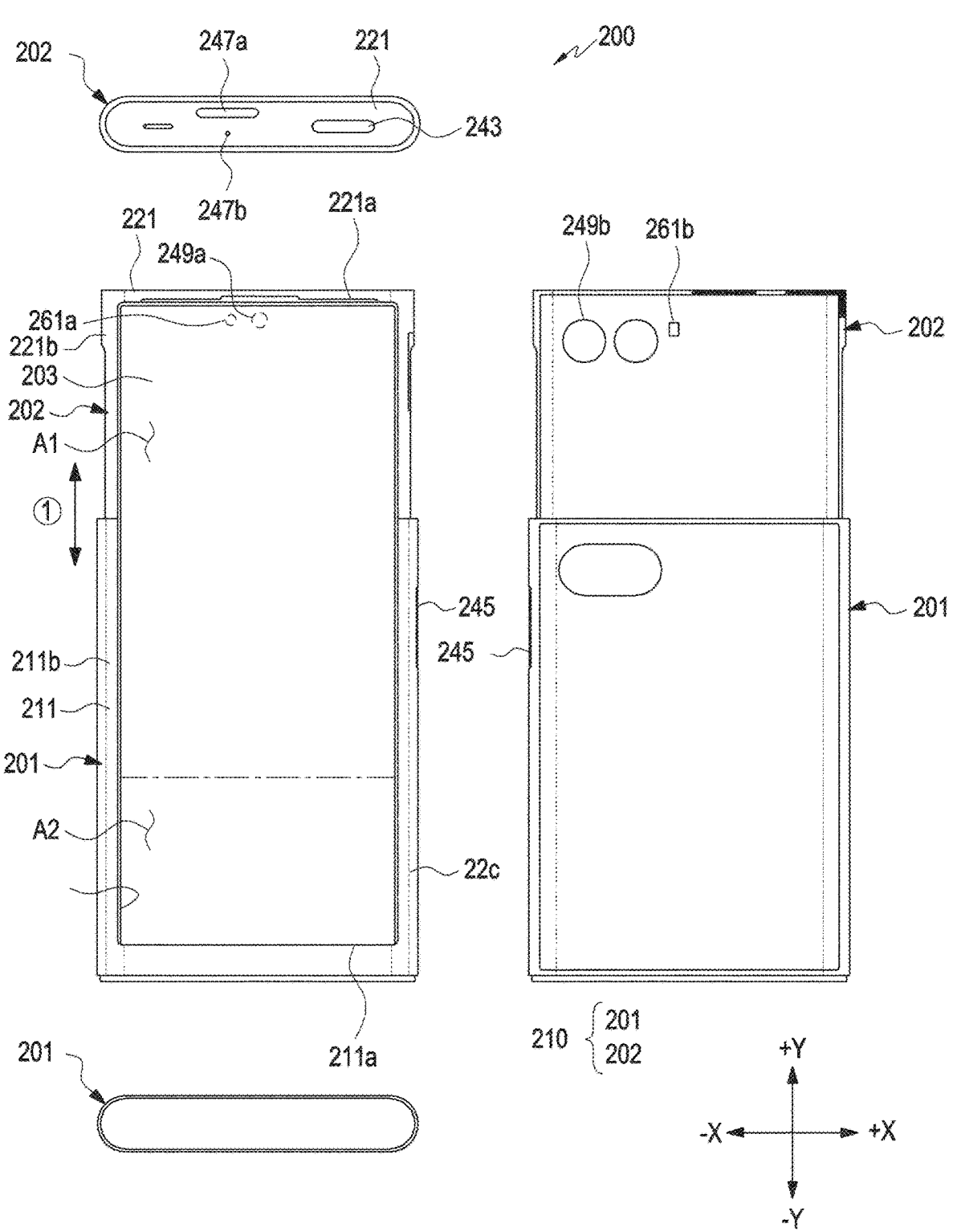
FIG. 3 is a view illustrating a state in which a second display area of a display is exposed to the outside of a housing according to an embodiment of the disclosure.

FIG. 3 is a view illustrating a state in which a second display area of a display is exposed to the outside of a housing according to an embodiment of the disclosure.

FIGS. 2 and 3 illustrate a structure in which a display 203 (e.g., flexible display or rollable display) is extended in the length direction (e.g., +Y direction) when the electronic device 200 is viewed from the front. However, the extending direction of the display 203 is not limited to one direction (e.g., +Y direction). For example, the extending direction of the display 203 may be changed in design to be extendable in the upper direction (+Y direction), right direction (e.g., +X direction), left direction (e.g., -X direction), and/or lower direction (e.g., -Y direction).

The state illustrated in FIG. 2 may be referred to as a "slide-in state" of the electronic device 200 or a "closed state" of the second display area A2 of the display 203.

The state illustrated in FIG. 3 may be referred to as a "slide-out state" of the electronic device 200 or an "open state" of the second display area A2 of the display 203.

The embodiments of FIGS. 2 and 3 may be combined with the embodiment of FIG. 1 or the embodiments of FIGS. 4 to 20.

Referring to FIGS. 2 and 3, an electronic device 200 (e.g., the electronic device 101 of FIG. 1) may include a housing 210. The housing 210 may include a first housing 201 and a second housing 202 disposed to be movable relative to the first housing 201. According to an embodiment of the disclosure, the electronic device 200 may be interpreted as having a structure in which the first housing 201 is disposed to be slidable with respect to the second housing 202. According to an embodiment of the disclosure, the second housing 202 may be disposed to perform reciprocating motion by a predetermined distance in a predetermined direction with respect to the first housing 201, for example, a direction indicated by an arrow ①..

According to an embodiment of the disclosure, the second housing 202 may be referred to as a "slide portion" or a "slide housing," and may be movable relative to the first housing 201. According to an embodiment of the disclosure, the second housing 202 may receive various electrical and electronic components, such as a circuit board or a battery. When the electronic device 200 is in the slide-in state, the second housing 202 may be defined as being in a "retracted position," and when the electronic device 200 is in the slide-out state, the second housing 202 may be defined as being in an "extended position."

According to an embodiment of the disclosure, the slide-in state of the electronic device 200 (or the slide-out state of the electronic device 200) may be changed into the slide-out state of the electronic device 200 (or the slide-in state of the electronic device 200) based on a predefined user input. For example, the slide-in state of the electronic device 200 (or the slide-out state of the electronic device 200) may be changed into the slide-out state (or the slide-in state of the electronic device 200) in response to a user input to a physical button exposed through a portion of the first housing 201 or a portion of the second housing 202. For example, the slide-in state (or the slide-out state of the electronic device 200) may be changed into the slide-out state (or the slide-in state of the electronic device 200) in response to a touch input to an executable object displayed in the screen display area (e.g., a first display area A1). For example, the slide-in state (or the slide-out state of the electronic device 200) may be changed into the slide-out state (or the slide-in state of the electronic device 200) in response to a touch input having a pressing strength of a reference strength or more at a contact point on the screen display area (e.g., the first display area A1). For example, the slide-in state (or the slide-out state of the electronic device 200) may be changed into the slide-out state (or the slide-in state of the electronic device 200) in response to a voice input received through the microphone of the electronic device 200. For example, the slide-in state (or the slide-out state of the electronic device 200) may be changed into the slide-out state (or the slide-in state of the electronic device 200) in response to an external force applied to the first housing 201 and/or the second housing 202 to move the second housing 202 with respect to the first housing 201. For example, the slide-in state (or the slide-out state of the electronic device 200) may be changed into the slide-out state (or the slide-in state of the electronic device 200) in response to a user input identified from an external electronic device (e.g., earbuds or a smart watch) connected with the electronic device 200. However, the slide in-out operations of the electronic device 200 are not limited thereto.

According to an embodiment of the disclosure, the first housing 201 may receive an actuator (e.g., a driving motor), a speaker, a sim socket, and/or a sub circuit board electrically connected with a main circuit board. The second housing 202 may receive a main circuit board on which electric components, such as an application processor (AP) and a communication processor (CP) are mounted. According to an embodiment of the disclosure, the second housing 202 may receive the actuator, speaker, sim socket, and/or the sub circuit board electrically connected with the main circuit board, and the first housing 201 may receive the main circuit board where electrical components, such as an application processor (AP) or a communication processor (CP), are mounted. According to an embodiment of the disclosure, the sub circuit board and the main circuit board may be disposed in the first housing 201 or the second housing 202.

According to an embodiment of the disclosure, the first housing 201 may include a first cover member 211 (e.g., a main case). The first cover member 211 may include a 1-1$^{th}$ sidewall 211a, a 1-2$^{th}$ sidewall 211b extending from the 1-1$^{th}$ sidewall 211a, and a 1-3$^{th}$ sidewall 211c extending from the 1-1$^{th}$ sidewall 211a and substantially parallel to the 1-2$^{th}$ sidewall 211b. According to an embodiment of the disclosure, the 1-2$^{th}$ sidewall 211b and the 1-3$^{th}$ sidewall 211c may be formed substantially perpendicular to the 1-1$^{th}$ sidewall 211a.

According to an embodiment of the disclosure, the 1-1$^{th}$ sidewall 211a, 1-2$^{th}$ sidewall 211b, and 1-3$^{th}$ sidewall 211c of the first cover member 211 may be formed to have a side opening (e.g., front opening) to receive (or surround) at least a portion of the second housing 202. For example, at least a portion of the second housing 202 may be surrounded by the first housing 201 and be slid in the direction parallel to the first surface, e.g., arrow ① direction, while being guided by the first housing 201. According to an embodiment of the disclosure, the 1-1$^{th}$ sidewall 211$a$, the 1-2$^{th}$ sidewall 211$b$, and/or the 1-3$^{th}$ sidewall 211$c$ of the first cover member 211 may be integrally formed. According to an embodiment of the disclosure, the 1-1$^{th}$ sidewall 211$a$, the 1-2$^{th}$ sidewall 211$b$, and/or the 1-3$^{th}$ sidewall 211$c$ of the first cover member 211 may be formed as separate structures and be combined or assembled.

According to an embodiment of the disclosure, the first cover member 211 may be formed to surround at least a portion of the display 203. For example, at least a portion of the display 203 may be formed to be surrounded by the 1-1$^{th}$ sidewall 211$a$, the 1-2$^{th}$ sidewall 211$b$, and/or the 1-3$^{th}$ sidewall 211$c$ of the first cover member 211.

According to an embodiment of the disclosure, the second housing 202 may include a second cover member 221 (e.g., a slide plate). The second cover member 221 may have a plate shape and include a first surface supporting internal components. For example, the second cover member 221 may support at least a portion of the display 203 (e.g., the first display area A1). According to an embodiment of the disclosure, the second cover member 221 may be referred to as a "front cover."

According to an embodiment of the disclosure, the second cover member 221 may include a 2-1$^{th}$ sidewall 221$a$, a 2-2$^{th}$ sidewall 221$b$ extending from the 2-1$^{th}$ sidewall 221$a$, and a 2-3$^{th}$ sidewall 221$c$ extending from the 2-1$^{th}$ sidewall 221$a$ and substantially parallel to the 2-2$^{th}$ sidewall 221$b$. According to an embodiment of the disclosure, the 2-2$^{th}$ sidewall 221$b$ and the 2-3$^{th}$ sidewall 221$c$ may be formed substantially perpendicular to the 2-1$^{th}$ sidewall 221$a$.

According to various embodiments of the disclosure, as the second housing 202 moves in a first direction (e.g., direction ①) parallel to the 2-2$^{th}$ sidewall 221$b$ or the 2-3$^{th}$ sidewall 221$c$, the slide-in state and slide-out state of the electronic device 200 may be formed. In the slide-in state of the electronic device 200, the second housing 202 may be positioned at a first distance from the 1-1$^{th}$ sidewall 211$a$ of the first housing 201. In the slide-out state of the electronic device 200, the second housing 202 may move to be positioned at a second distance larger than the first distance from the 1-1$^{th}$ sidewall 211$a$ of the first housing 201. In an embodiment of the disclosure, in the slide-in state of the electronic device 200, the first housing 201 may be formed to surround a portion of the 2-2$^{th}$ sidewall 221$b$ and the 2-3$^{th}$ sidewall 221$c$.

According to an embodiment of the disclosure, the electronic device 200 may have an intermediate state (hereinafter, referred to as an "intermediate state") between the slide-in state (e.g., fully closed state) of FIG. 2 and the slide-out state (e.g., fully open state) of FIG. 3. The distance between the 1-1$^{th}$ sidewall 211$a$ and the 2-1$^{th}$ sidewall 221$a$ in the intermediate state of the electronic device 200 may be shorter than the distance between the 1-1$^{th}$ sidewall 211$a$ and the 2-1$^{th}$ sidewall 221$a$ of the electronic device 200 in the fully open state and be longer than the distance between the 1-1$^{th}$ sidewall 211$a$ and the 2-1$^{th}$ sidewall 221$a$ of the electronic device 200 in the fully closed state. According to an embodiment of the disclosure, as at least a portion of the display 203 slides in the intermediate state of the electronic device 200, the area exposed to the outside may vary. For example, in the intermediate state of the electronic device 200, the ratio of the width (length in the X direction) to the height (length in the Y direction) of the display 203 and/or the distance between the 1-1$^{th}$ sidewall 211$a$ and the 2-1$^{th}$ sidewall 221$a$ may be changed based on the slide of the electronic device 200.

According to an embodiment of the disclosure, the electronic device 200 may include a driving structure (not shown) for moving the second housing 202 relative to the first housing 201. For example, the driving structure may include an actuator (e.g., a driving motor) configured to generate a driving force for sliding the second housing 202 with respect to the first housing 201.

According to an embodiment of the disclosure, the actuator may be controlled by a processor (e.g., the processor 120 of FIG. 1). For example, the processor 120 may include an actuator driver driving circuit and transfer a pulse width modulation (PWM) signal for controlling the speed of the actuator and/or the torque of the actuator 241 to the actuator.

According to an embodiment of the disclosure, the electronic device 200 may be configured to stop in a designated intermediate state between the slide-in state and the slide-out state by controlling driving of the actuator 241 (free stop function). According to an embodiment of the disclosure, the electronic device 200 may be changed to the slide-in state, the intermediate state, or the slide-out state through the user's manipulation in the state in which the driving force is not provided to the actuator 241.

According to an embodiment of the disclosure, the electronic device 200 may include a display 203, a key input device 245, a connector hole 243, audio modules 247$a$ and 247$b$, and/or camera modules 249$a$ and 249$b$. According to an embodiment of the disclosure, the electronic device 200 may further include an indicator (e.g., a light emitting diode (LED) device) or various sensor modules.

According to an embodiment of the disclosure, the display 203 may be formed so that the size of a portion of the housing 210, which may be viewed from the front, is changed based on the slide of the second housing 202. According to an embodiment of the disclosure, the display 203 may include the first display area A1 and a second display area A2 configured to be exposed to the outside of the electronic device 200 based on the slide of the second housing 202.

According to an embodiment of the disclosure, the first display area A1 may be disposed on the second housing 202. For example, the first display area A1 may be disposed on the second cover member 221 of the second housing 202. According to an embodiment of the disclosure, the second display area A2 may extend from the first display area A1, and the second display area A2 may be received in the first housing 201 or visually exposed to the outside of the electronic device 200 as the second housing 202 slides relative to the first housing 201. According to an embodiment of the disclosure, as the electronic device 200 changes from the slide-in state to slide-out state, the display 203 may extend in the lower direction (e.g., −Y direction) of the electronic device 200. For example, in the slide-out state of the electronic device 200, the second display area A2 may be visually exposed under the display 203 (e.g., in the −Y direction). According to an embodiment of the disclosure, as the electronic device 200 changes from the slide-in state to slide-out state, the display 203 may extend in the upper direction (e.g., +Y direction) of the electronic device 200. For example, in the slide-out state of the electronic device 200, the second display area A2 may be visually exposed above the display 203 (e.g., in the +Y direction).

According to an embodiment of the disclosure, the second display area A2 may be received in the space positioned inside the first housing 201 or exposed to the outside of the electronic device 200 while being substantially guided by one area of the first housing 201. According to an embodiment of the disclosure, the second display area A2 may move based on a slide of the second housing 202 in the first direction (e.g., the direction indicated by the arrow ①).. For example, while the second housing 202 slides, a portion of the second display area A2 may be deformed into a curved shape in a position corresponding to the curved surface of the first housing 201.

According to an embodiment of the disclosure, as viewed from above the second cover member 221 (e.g., front cover), if the electronic device 200 changes from the slide-in state to slide-out state (e.g., if the second housing 202 slides to extend from the first housing 201), the second display area A2 may be gradually exposed to the outside of the first housing 201 and, together with the first display area A1, form a substantially flat surface. According to an embodiment of the disclosure, the display 203 may be coupled with or disposed adjacent to a touch detection circuit, a pressure sensor capable of measuring the strength (pressure) of touches, and/or a digitizer for detecting a magnetic field-type stylus pen. According to an embodiment of the disclosure, irrespective of the slide-in state or slide-out state of the electronic device 200, the exposed portion of the second display area A2 may be positioned on a portion of the first housing, and a portion of the second display area A2 may remain in the curved shape.

According to an embodiment of the disclosure, the key input device 245 may be positioned in an area of the housing 210 (e.g., the first housing 201 and/or second housing 202). Depending on the appearance and the state of use, the electronic device 200 may be designed to omit the illustrated key input device 245 or to include additional key input device(s). According to an embodiment of the disclosure, the electronic device 200 may include a key input device (not shown), e.g., a home key button or a touchpad disposed around the home key button. According to an embodiment of the disclosure, at least a portion of the key input device 245 may be disposed on the 1-1$^{th}$ sidewall 211a, the 1-2$^{th}$ sidewall 211b, or the 1-3$^{th}$ sidewall 211c of the first housing 201. According to an embodiment of the disclosure, at least a portion of the key input device 245 may be disposed on the 2-1$^{th}$ sidewall 221a, the 2-2$^{th}$ sidewall 221b, and/or the 2-3$^{th}$ sidewall 221c of the second housing 202.

According to an embodiment of the disclosure, the connector hole 243 may be omitted or may receive a connector (e.g., a universal serial bus (USB) connector) for transmitting and receiving power and/or data with an external electronic device. According to an embodiment (not shown), the electronic device 200 may include a plurality of connector holes 243, and some of the plurality of connector holes 243 may function as connector holes for transmitting/receiving audio signals with an external electronic device. In the illustrated embodiment of the disclosure, the connector hole 243 is disposed in the second housing 202, but is not limited thereto. For example, the connector hole 243 or a connector hole not shown may be disposed in the first housing 201.

According to an embodiment of the disclosure, the audio modules 247a and 247b may include at least one speaker hole 247a or at least one microphone hole 247b. One of the speaker holes 247a may be provided as a receiver hole for voice calls, and the other may be provided as an external speaker hole. The electronic device 200 may include a microphone for obtaining sound. The microphone may obtain external sound of the electronic device 200 through the microphone hole 247b. According to an embodiment of the disclosure, the electronic device 200 may include a plurality of microphones to detect the direction of sound.

According to an embodiment of the disclosure, the electronic device 200 may include an audio module in which the speaker hole 247a and the microphone hole 247b are implemented as one hole or may include a speaker without the speaker hole 247a (e.g., a piezo speaker). According to an embodiment of the disclosure, the speaker hole 247a and the microphone hole 247b may be positioned in the first housing 201 and/or the second housing 202.

According to an embodiment of the disclosure, the camera modules include a first camera module 249a (e.g., front camera) and/or a second camera module 249b (e.g., rear camera).

According to an embodiment of the disclosure, an indicator (not shown) of the electronic device 200 may be disposed on the first housing 201 or the second housing 202, and the indicator may include a light emitting diode to provide state information about the electronic device 200 as a visual signal. A sensor module 261a or 261b of the electronic device 200 may produce an electrical signal or data value corresponding to the internal operation state or external environment state of the electronic device. The sensor module 261a or 261b may include a proximity sensor, a fingerprint sensor, and/or a biometric sensor (e.g., an iris/face recognition sensor or a heartrate monitor (HRM) sensor). According to an embodiment of the disclosure, the sensor module 261a or 261b may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor. According to an embodiment of the disclosure, the sensor module 261a or 261b may be disposed in the first housing 201 and/or the second housing 202. The sensor modules 261a and 261b may include a first sensor module 261a (e.g., proximity sensor or illuminance sensor) disposed on the front surface of the electronic device 200 and/or a second sensor module 261b (e.g., heart rate monitoring (HRM) sensor) disposed on the rear surface of the electronic device 200.

Figure 4:
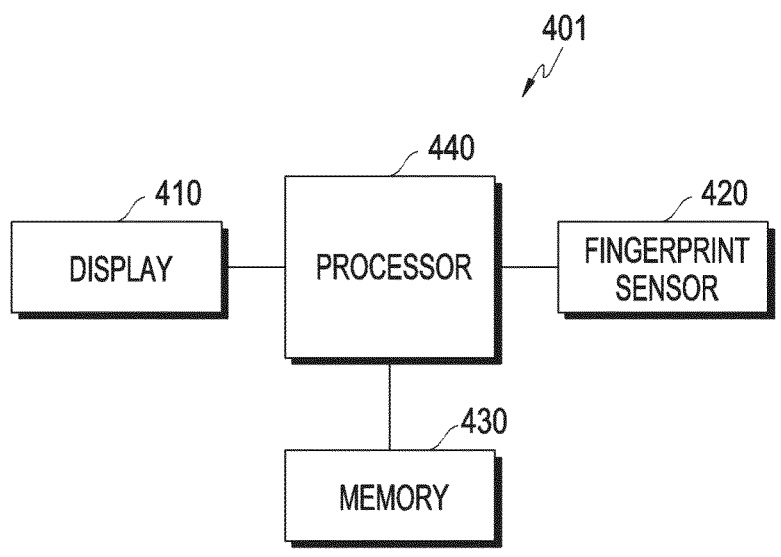
FIG. 4 is a block diagram illustrating an electronic device according to an embodiment of the disclosure.

FIG. 4 is a block diagram illustrating an electronic device 401 according to an embodiment of the disclosure.

Referring to FIG. 4, in an embodiment of the disclosure, an electronic device 401 may be the electronic device 101 of FIG. 1 or the electronic device 200 of FIGS. 2 and 3. For example, as the electronic device 200 of FIGS. 2 and 3, the electronic device may include a first housing (e.g., the first housing 201) (hereinafter, referred to as a "first housing"), a second housing (e.g., the second housing 202) (hereinafter, referred to as a "second housing") movably disposed with respect to the first housing, and a rollable display (e.g., the display 203) having an externally disposed area changed based on a movement (e.g., a sliding movement) of the second housing.

In an embodiment of the disclosure, the electronic device may include a display 410, a fingerprint sensor 420, memory 430, and/or a processor 440.

In an embodiment of the disclosure, the display 410 may be the display module 160 of FIG. 1 or the display 203 of FIGS. 2 and 3. For example, in the display 410, the display area exposed to the outside of the electronic device may be extended or reduced based on the sliding movement of the second housing relative to the first housing (e.g., the movement of the second housing relative to the first housing). For example, the display 410 may include a first display area (e.g., the first display area A1) (hereinafter, referred to as a "first display area") exposed to the outside in the slide-in state and the slide-out state of the electronic device, and a second display area (e.g., the second display area A2) (hereinafter, referred to as a "second display area") extending from the first display area and received inside the first housing or visually exposed to the outside of the electronic device as the second housing slides with respect to the first housing.

In an embodiment of the disclosure, the display 410 may include a touch sensor. The display including the touch sensor (or a display configured by being coupled to the touch sensor) may be referred to as a "touch display" or a "touch screen". The touch sensor may obtain the user's touch input to the display 410. For example, when the user touches the display 410 using her finger, the touch sensor may generate a touch signal generated by the touch. In an embodiment of the disclosure, the touch sensor may be a touch sensor using a capacitive method. For example, the touch sensor may detect the intensity of the touch signal (or the variation in the intensity of the touch signal) (e.g., the variation in capacitance) using a mutual capacitance method or a self-capacitance method. Based on the intensity of the touch signal, the position (e.g., coordinates) touched by the user on the display 410 may be obtained (e.g., calculated). In the above-described example, it has been described that the touch sensor is included in the display 410, but the disclosure is not limited thereto. For example, the touch sensor may be disposed in the electronic device independently (or separately) from the display 410.

In an embodiment of the disclosure, the fingerprint sensor 420 (also referred to as a "fingerprint recognition sensor") may obtain fingerprint information (e.g., a fingerprint image) about the user based on the user's touch on the display 410.

In an embodiment of the disclosure, the fingerprint sensor 420 may obtain fingerprint information about the user using a capacitive method based on a difference in permittivity caused by ridges and valleys, an optical method based on a difference in light reflected by ridges and valleys constituting the fingerprint, or an ultrasonic method based on a phase difference of ultrasonic waves reflected by ridges and valleys. However, the method in which the fingerprint sensor 420 obtains fingerprint information is not limited to the above-described examples.

In an embodiment of the disclosure, the fingerprint sensor 420 may be disposed under (or within) the display 410. However, the disclosure is not limited thereto. For example, the fingerprint sensor 420 may be disposed to overlap at least a portion of the display 410.

In an embodiment of the disclosure, the fingerprint sensor 420 may be moved by a sliding movement of the second housing with respect to (or relative to) the first housing (hereinafter, also referred to as a "sliding movement of the second housing"). For example, the position of the fingerprint sensor 420 may be changed according to the sliding movement of the second housing. For example, the position of the fingerprint sensor 420 may be changed by a distance corresponding to (e.g., substantially identical to) the distance by which the second housing slides when the second housing slides. For example, when the second housing slides, the fingerprint sensor 420 may be moved relative to the first housing (e.g., the 1-1$^{th}$ sidewall 211a of the first housing 201) (e.g., with respect to the first housing) by the same distance as the distance by which the second housing slides in the direction in which the second housing slides.

In an embodiment of the disclosure, although not illustrated in FIG. 4, the electronic device 401 may further include a sensor (hereinafter, referred to as a "first sensor") for obtaining information about the position and/or distance by which the second housing slides with respect to the first housing. For example, the information about the position and/or distance by which the second housing slides with respect to the first housing may include the position (e.g., the 2-1$^{th}$ side wall 221a of the second housing 202) of the second housing relative to the first housing (e.g., the 1-1$^{th}$ side wall 211a of the first housing 201) in the current state of the electronic device 401 and/or the distance (e.g., the slid-out distance of the second housing in the sliding direction of the second housing) to the position of the second housing in the current state (e.g., the intermediate state or the slide-out state) of the electronic device 401 from the position of the second housing in the slide-in state of the electronic device 401. For example, the information about the position and/or distance by which the second housing slides with respect to the first housing may include a distance to the position (e.g., the position of one point of the display 410 in the slide-out state or the intermediate state) of the display 410 in the current state of the electronic device 401 from the position (e.g., the position of one point of the display 410 in the slide-in state) of the display 410 in the slide-in state of the electronic device 401.

In an embodiment of the disclosure, the first sensor may detect a magnetic field (or a change in the magnetic field) formed by a magnet disposed in the second housing, thereby obtaining information about the position and/or distance by which the second housing slides with respect to the first housing. The first sensor may include a plurality of hall sensors disposed in the first housing.

In an embodiment of the disclosure, the first sensor may detect an optical pattern disposed in the second housing, thereby obtaining information about the position and/or distance by which the second housing slides with respect to the first housing. The first sensor may include an optical sensor (e.g., a photo detector) disposed in the first housing.

In an embodiment of the disclosure, the first sensor may obtain information about the position and/or distance by which the second housing slides with respect to the first housing and may include an inertial sensor (also referred to as a "motion sensor") (e.g., an acceleration sensor) disposed in the first housing and/or the second housing. However, the first sensor is not limited to the above-described examples.

In an embodiment of the disclosure, although not illustrated in FIG. 4, the electronic device 401 may include a driving motor (also referred to as an "actuator") that enables the second housing to slide with respect to the first housing. The driving motor may enable the second housing to slide with respect to the first housing under the control of the processor 440.

In an embodiment of the disclosure, the memory 430 may be the memory 130 of FIG. 1.

In an embodiment of the disclosure, the memory 430 may store registered fingerprint information. The registered fingerprint information (also referred to as a "fingerprint template") may include a registered fingerprint image, feature points (also referred to as "features") extracted from the fingerprint image, and/or a combination of feature points extracted from a plurality of fingerprint images (e.g., a map including feature points extracted from a plurality of fingerprint images). In an embodiment of the disclosure, the registered fingerprint information may be referred to as a "fingerprint template". However, the information stored in the memory 430 is not limited to the registered fingerprint information.

In an embodiment of the disclosure, the processor 440 may be the processor 120 of FIG. 1.

In an embodiment of the disclosure, the processor 440 may control the overall operation of performing authentication using the fingerprint sensor 420. In an embodiment of the disclosure, the processor 440 may include one or more processors for performing authentication using the fingerprint sensor 420. An operation in which the processor 440 performs authentication using the fingerprint sensor 420 is described below with reference to FIGS. 5 to 20.

Although FIG. 4 illustrates that the electronic device 401 includes the display 410, the fingerprint sensor 420, the memory 430, and/or the processor 440, the disclosure is not limited thereto. For example, the electronic device 401 may further include at least one of components included in the electronic device 101 of FIG. 1 or components included in the electronic device 200 of FIGS. 2 and 3.

Figure 5:
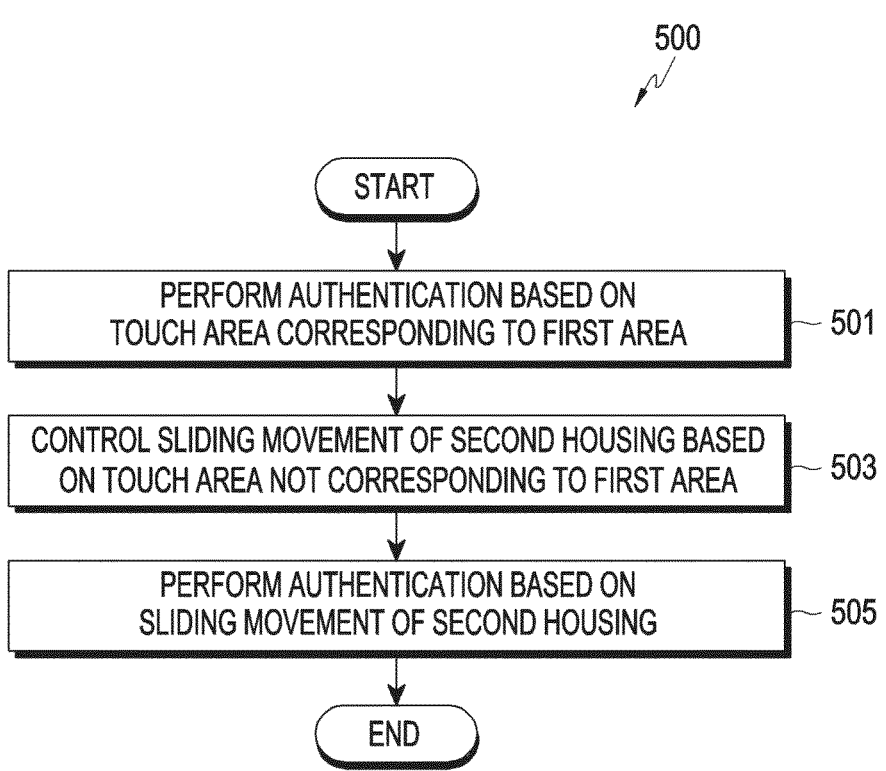
FIG. 5 is a flowchart illustrating a method for performing authentication using a fingerprint sensor, according to an embodiment of the disclosure.

FIG. 5 is a flowchart 500 illustrating a method for performing authentication using a fingerprint sensor 420 according to an embodiment of the disclosure.

Referring to FIG. 5, in operation 501, in an embodiment of the disclosure, the processor 440 may perform authentication using the fingerprint sensor 420, based on a touch area touched by the user (e.g., the user's finger) on the display 410 corresponding to a first area (hereinafter, referred to as a "first area") corresponding to the fingerprint sensor 420 in the display 410. Hereinafter, operation 501 is described with reference to FIGS. 6 and 7.

Figure 6:
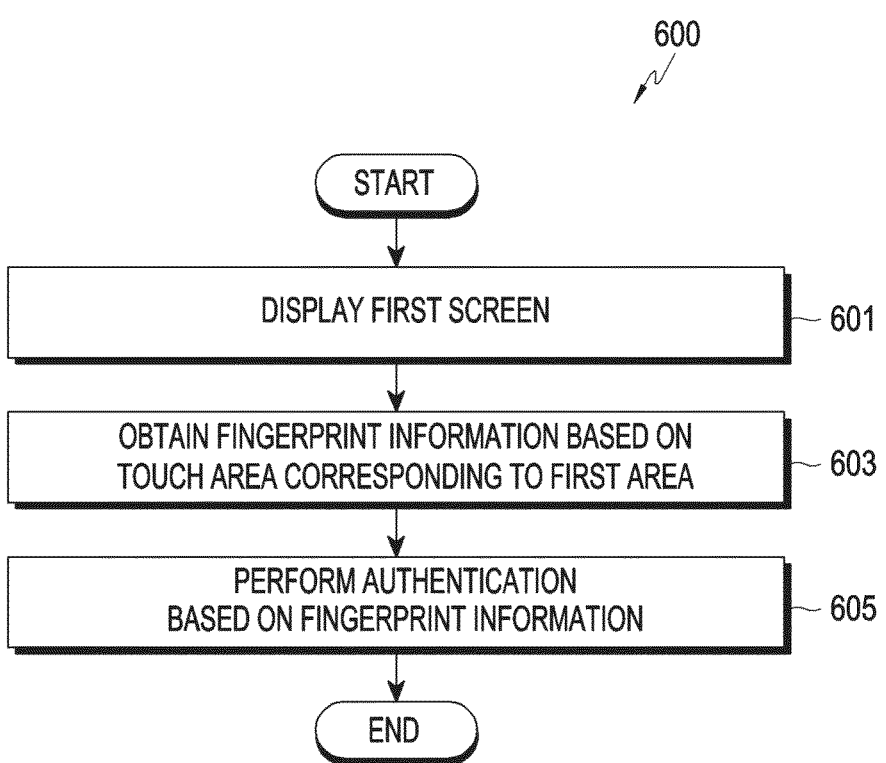
FIG. 6 is a flowchart illustrating a method for performing authentication based on a touch area corresponding to a first area, according to an embodiment of the disclosure.

FIG. 6 is a flowchart 600 illustrating a method for performing authentication based on a touch area corresponding to a first area, according to an embodiment of the disclosure.

Figure 7:
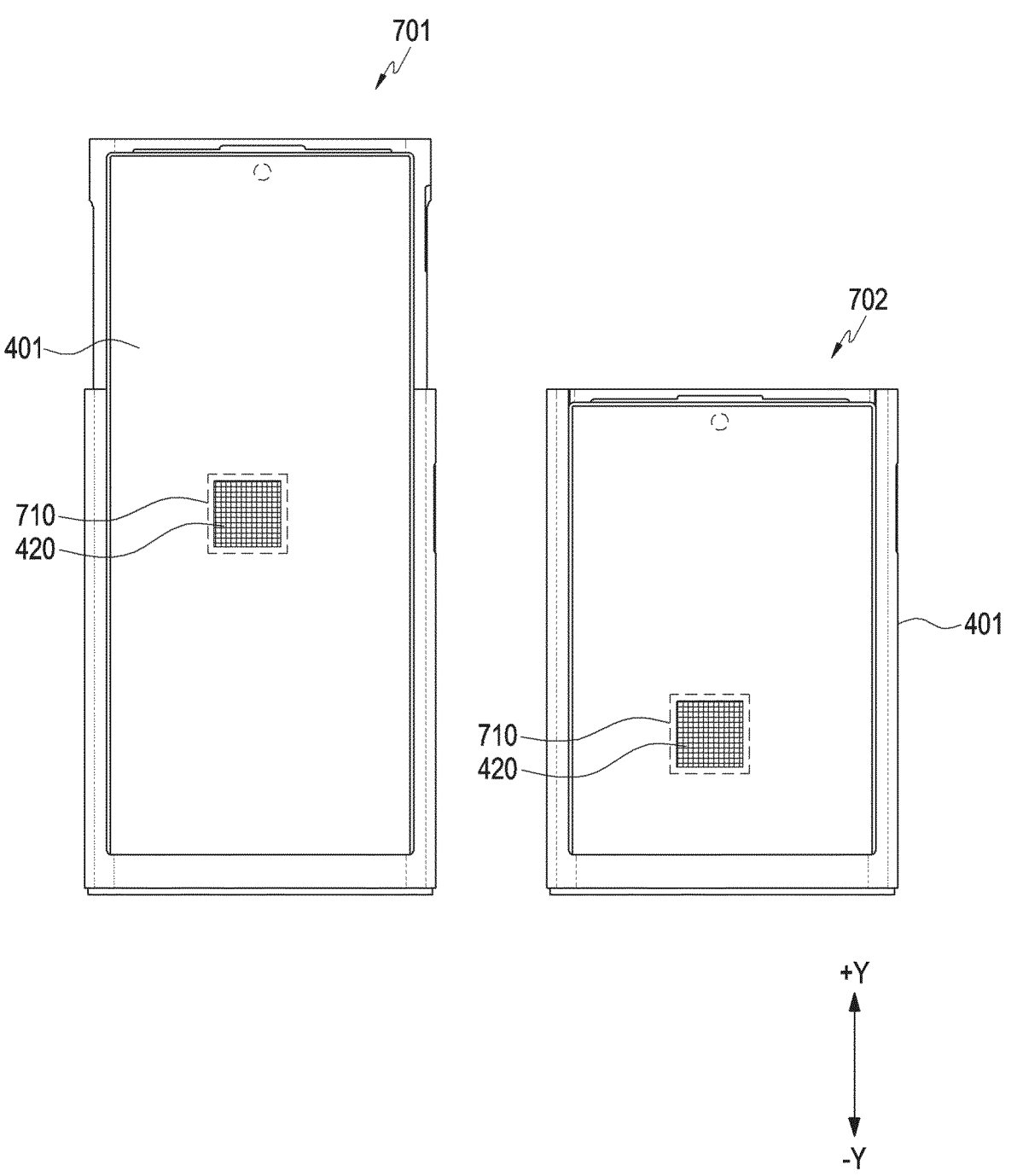
FIG. 7 is a view illustrating a first area according to an embodiment of the disclosure.

FIG. 7 is a view illustrating a first area according to an embodiment of the disclosure.

Referring to FIGS. 6 and 7, in operation 601, in an embodiment of the disclosure, the processor 440 may display a first screen related to authentication (hereinafter, referred to as a "first screen") through the display 410. For example, in a state in which the electronic device 401 is locked, the processor 440 may display, as the first screen, a lock screen including a guide image for fingerprint input (e.g., a virtual fingerprint image indicating an area in which fingerprint information can be obtained using the fingerprint sensor 420 on the display 410) (hereinafter, referred to as a "guide image for fingerprint input"). For example, when a payment function is executed, the processor 440 may display a screen including the guide image for fingerprint input as the first screen to authenticate the user using the fingerprint. For example, the processor 440 may display a screen including the guide image for fingerprint input as the first screen in order to perform fingerprint authentication for executing the application while the application is locked. However, the first screen related to authentication is not limited to the above-described examples.

In operation 603, in an embodiment of the disclosure, the processor 440 may obtain fingerprint information, based on the touch area (hereinafter, also referred to as a "touch area" or a "first touch area") touched by the user on the display 410 corresponding to the first area corresponding to the fingerprint sensor 420 in the display 410.

In an embodiment of the disclosure, the first area corresponding to the fingerprint sensor 420 (hereinafter, referred to as a "first area" or a "first area corresponding to the fingerprint sensor 420") may be an area in which fingerprint information can be obtained using the fingerprint sensor 420 in the display 410 or an area in which the fingerprint can be sensed (or detected) using the fingerprint sensor 420 in the display 410.

In an embodiment of the disclosure, the first area corresponding to the fingerprint sensor 420 may be an area corresponding to the position of the fingerprint sensor 420 in the display 410. In an embodiment of the disclosure, the size of the first area may be substantially the same as the size of the fingerprint sensor 420. For example, as shown in reference numerals 701 and 702 of FIG. 7, the size of the first area (e.g., the area indicated by the dashed line in reference numerals 701 and 702) may be substantially the same as the size of the fingerprint sensor 420. However, the disclosure is not limited thereto. For example, the size of the first area may be different from the size of the fingerprint sensor 420 depending on a method (e.g., a capacitive method, an optical method, and an ultrasonic method) of implementing the fingerprint sensor 420.

In an embodiment of the disclosure, the first area (e.g., the position of the first area) corresponding to the fingerprint sensor 420 may be moved by sliding the second housing relative to the first housing. For example, reference numeral 701 of FIG. 7 may indicate a slide-out state of the electronic device 401 (e.g., a state in which the second housing is maximally received with respect to the first housing), and reference numeral 702 of FIG. 7 may indicate a slide-in state of the electronic device 401 (e.g., a state in which the second housing is maximally slid out with respect to the first housing). The fingerprint sensor 420 (and the first area corresponding to the fingerprint sensor 420) may be moved by sliding second housing, as indicated by reference numerals 701 and 702.

In an embodiment of the disclosure, the first area corresponding to the fingerprint sensor 420 may be changed by the distance corresponding to (e.g., substantially identical to) the distance by which the second housing slides when the second housing slides. For example, when the second housing slides, the first area may be moved by the same distance as the distance by which the second housing slides in the direction in which the second housing slides with respect to the first housing (e.g., the 1-1$^{th}$ sidewall 211$a$ of the first housing 201) (e.g., with respect to the first housing).

In an embodiment of the disclosure, obtaining fingerprint information based on the touch area touched by the user on the display 410 corresponding to the first area may include, when the first area is touched by the user's finger, obtaining fingerprint information (e.g., a fingerprint image) using the fingerprint sensor 420 when the display 410 is touched by the finger without identifying the area touched by the finger in the display 410 using the touch sensor. However, the disclosure is not limited thereto. In an embodiment of the disclosure, the processor 440 may identify an area (hereinafter, also referred to as a "touch area") touched by the user using a touch sensor (e.g., a touch sensor included in the display 410).

In an embodiment of the disclosure, the processor 440 may identify (or determine) whether the touch area corresponds to the first area corresponding to the fingerprint sensor 420. For example, the processor 440 may identify whether at least a portion of the touch area overlaps the first area. The processor 440 may determine that the touch area corresponds to the first area based on at least a portion of the touch area overlapping the first area. The processor 440 may determine that the touch area does not correspond to the first area, based on at least a portion of the touch area not overlapping the first area.

In an embodiment of the disclosure, the processor 440 may obtain fingerprint information (e.g., the image of the fingerprint) using the fingerprint sensor 420 based on the touch area corresponding to the first area corresponding to the fingerprint sensor 420.

In operation 605, in an embodiment of the disclosure, the processor 440 may perform authentication (e.g., fingerprint authentication), based on fingerprint information obtained using the fingerprint sensor 420.

In an embodiment of the disclosure, the processor 440 may perform a preprocessing operation including a direction component extraction operation, a binarization operation, a smoothing operation, and/or a fine line operation on the fingerprint information (e.g., the fingerprint image). The processor 440 may extract feature points (minutiae) from the fingerprint image after performing the preprocessing operation on the fingerprint image obtained through the fingerprint sensor 420. The feature points may include the core point, the delta point, the ending point, and/or the bifurcation point constituting the ridge of the fingerprint.

In an embodiment of the disclosure, the processor 440 may determine whether authentication for the user succeeds or fails by comparing the fingerprint image with the registered fingerprint information. For example, the processor 440 may compare the feature points of the fingerprint image with the feature points (e.g., the feature points of the registered fingerprint image or a combination of the feature points extracted from the one or more registered fingerprint images) of the registered fingerprint information (e.g., the registered fingerprint image). By comparing the feature points of the fingerprint image with the feature points of the registered fingerprint information, the processor 440 may calculate a degree (e.g., a similarity score) (hereinafter, referred to as "similarity of the fingerprint image") at which the fingerprint image is similar to the registered fingerprint information. When the similarity of the fingerprint image is equal to or larger than a threshold similarity (hereinafter, referred to as a "threshold similarity" or a "first threshold similarity"), the processor 440 may determine that the authentication of the user is successful. When the similarity of the fingerprint image is less than the threshold similarity, the processor 440 may determine that authentication for the user fails.

In an embodiment of the disclosure, when it is determined that the authentication of the user fails, the processor 440 may display information indicating that the authentication of the user fails or information requesting the user to retry an operation for authentication (e.g., a touch input to the first area corresponding to the fingerprint sensor 420) through the display 410.

Referring back to FIG. 5, in operation 503, in an embodiment of the disclosure, the processor 440 may control the sliding movement of the second housing based on the touch area touched by the user on the display 410 not corresponding to the first area corresponding to the fingerprint sensor 420 in the display 410.

In operation 505, in an embodiment of the disclosure, the processor 440 may perform authentication (e.g., fingerprint authentication) based on the sliding movement of the second housing.

Hereinafter, operations 503 and 505 are described with reference to FIGS. 8 and 15.

Figure 8:
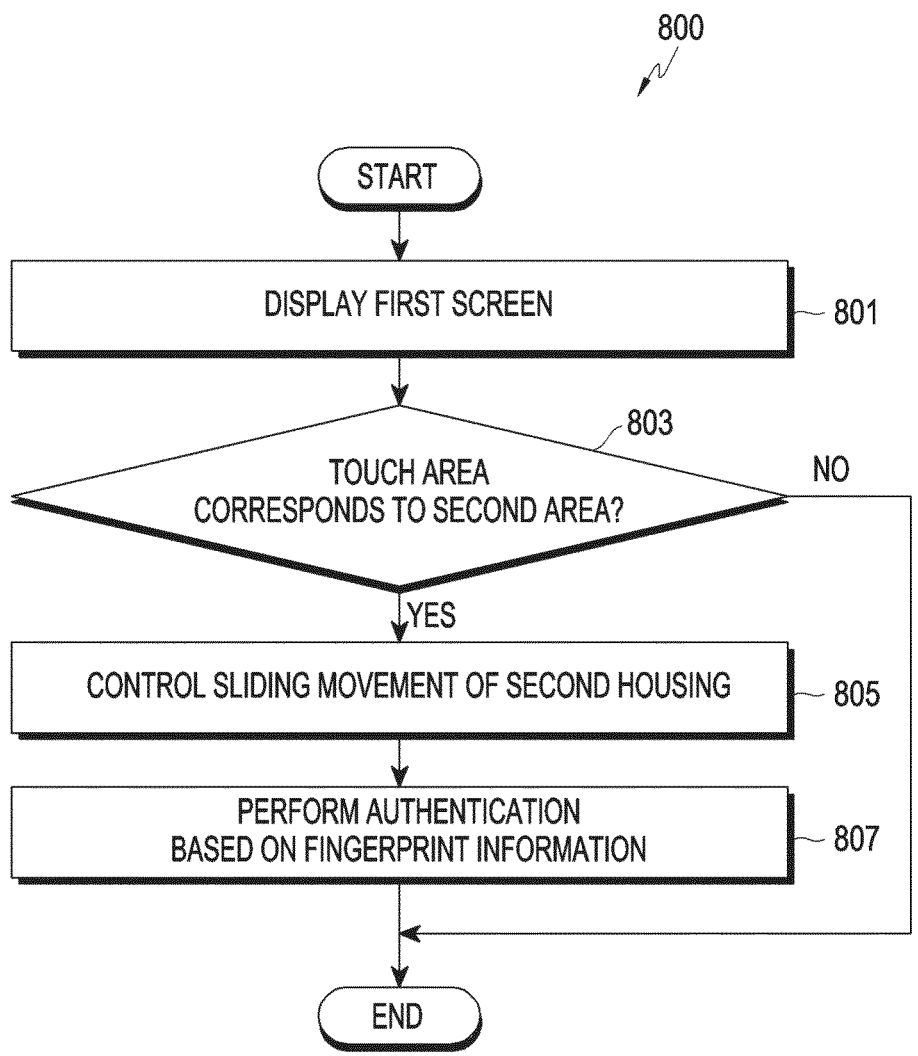
FIG. 8 is a flowchart illustrating a method for performing authentication based on a touch area corresponding to a second area, according to an embodiment of the disclosure.

FIG. 8 is a flowchart 800 illustrating a method for performing authentication based on a touch area corresponding to a second area, according to an embodiment of the disclosure.

Figure 9:
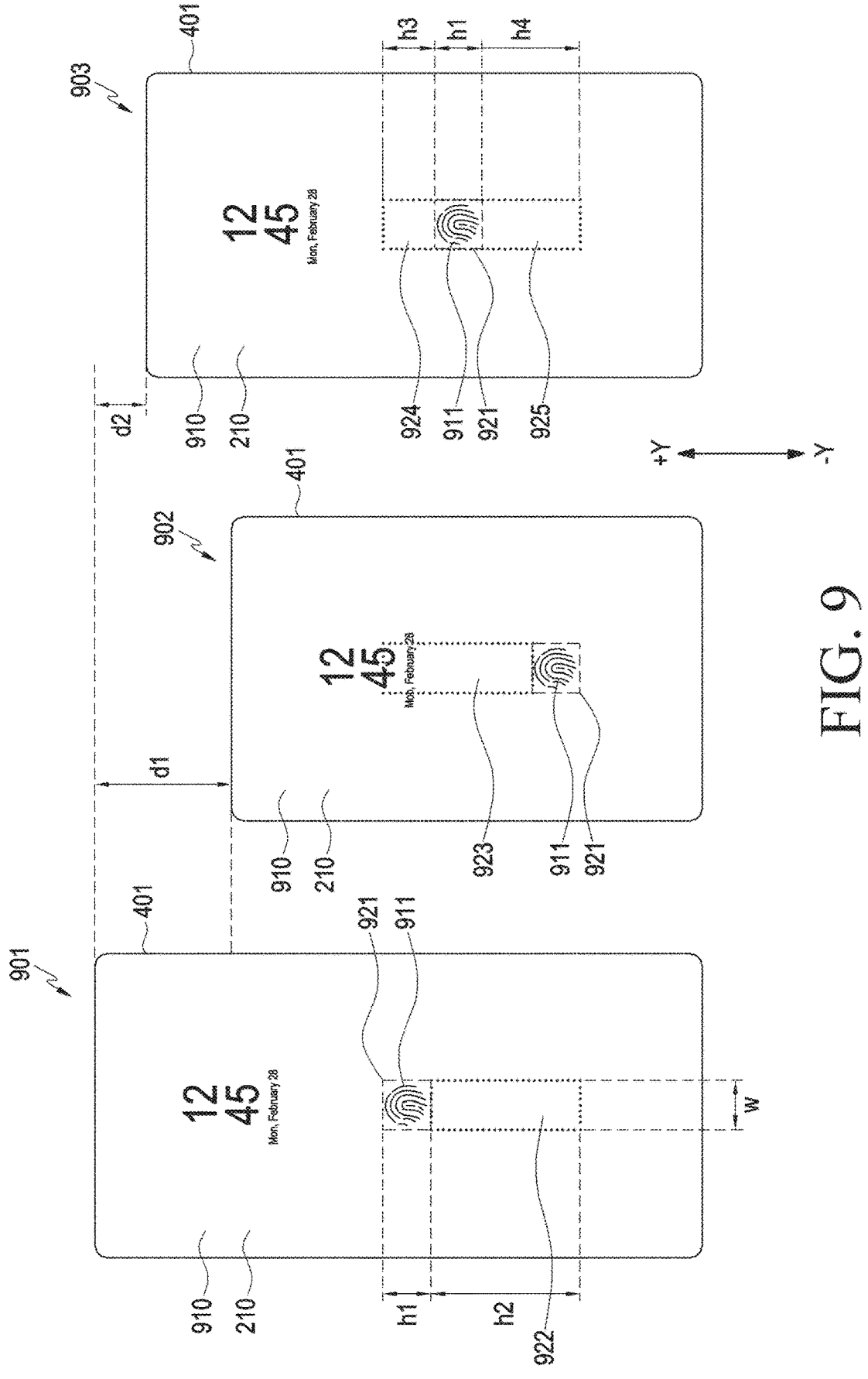
FIG. 9 is a view illustrating a second area according to an embodiment of the disclosure.

FIG. 9 is a view illustrating a second area according to an embodiment of the disclosure.

Figure 10:
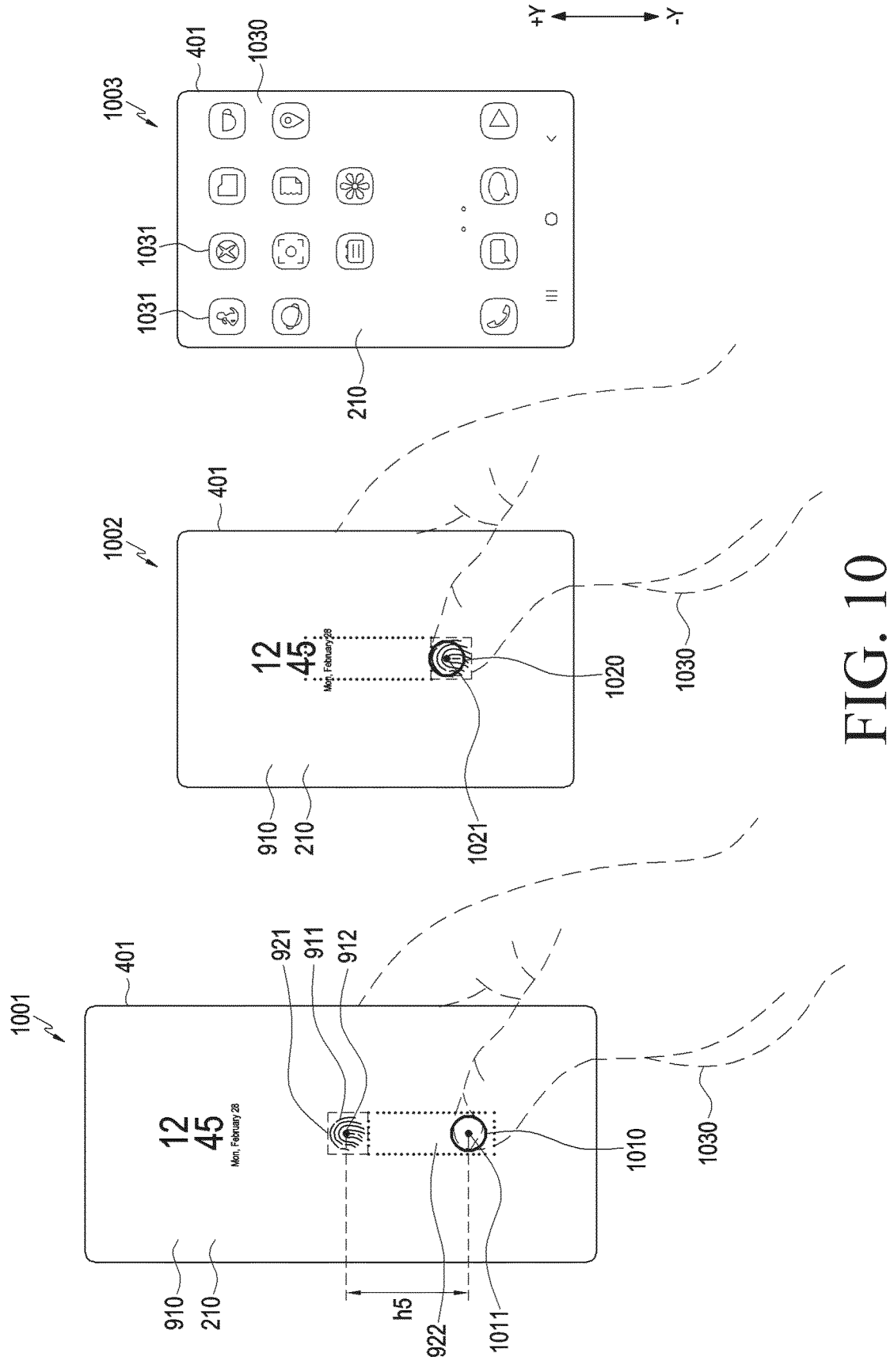
FIG. 10 is a view illustrating a method for performing authentication based on a touch area corresponding to a second area, according to an embodiment of the disclosure.

FIG. 10 is a view illustrating a method for performing authentication based on a touch area corresponding to a second area, according to an embodiment of the disclosure.

Figure 11:
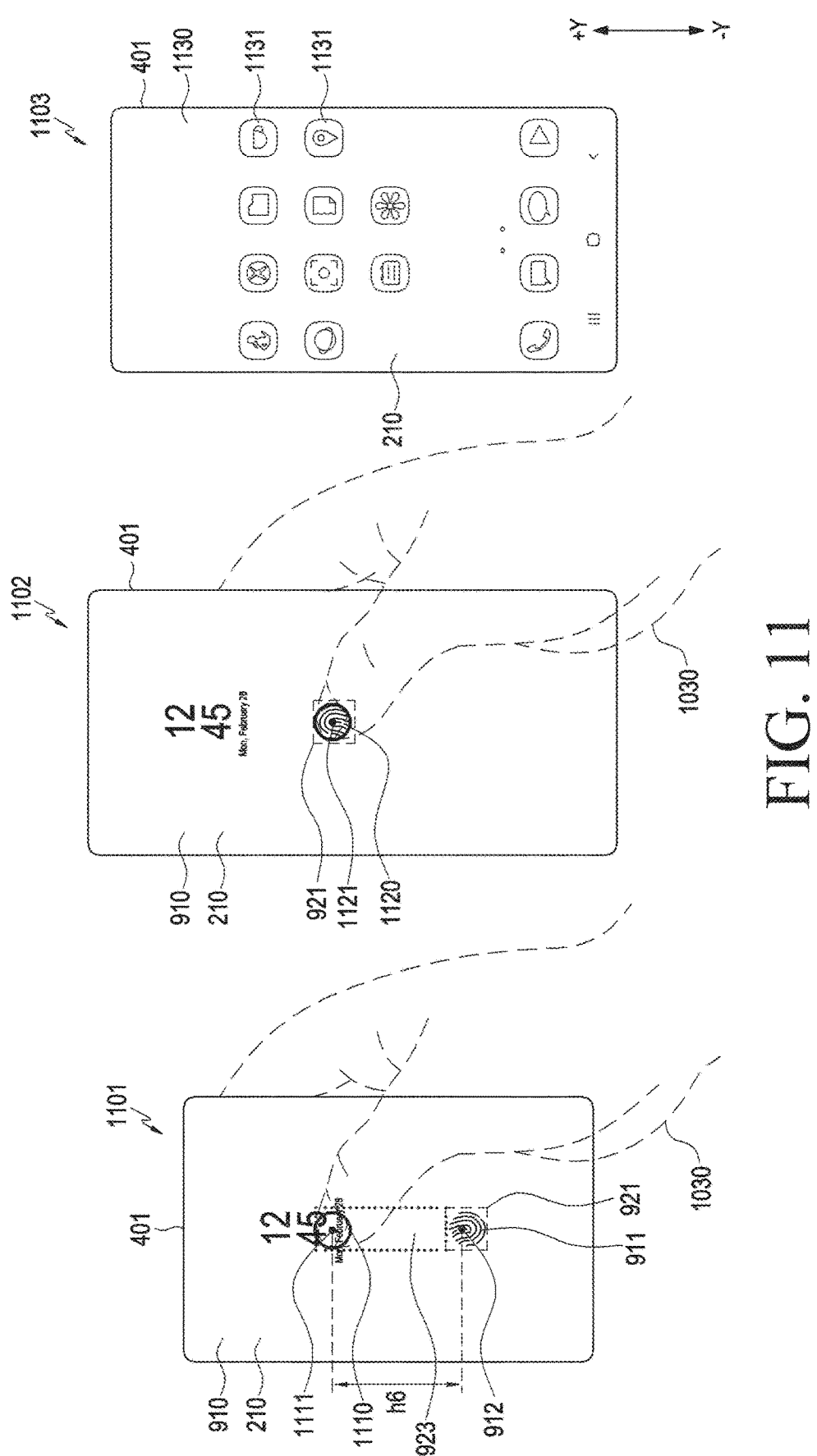
FIG. 11 is a view illustrating a method for performing authentication based on a touch area corresponding to a second area, according to an embodiment of the disclosure.

FIG. 11 is a view illustrating a method for performing authentication based on a touch area corresponding to a second area, according to an embodiment of the disclosure.

Referring to FIGS. 8 and 9, in operation 801, in an embodiment of the disclosure, the processor 440 may display a first screen related to authentication through the display 410.

Since operation 801 is at least partially the same or similar to the operation 601 of FIG. 6, no detailed description thereof is presented below.

In operation 803, in an embodiment of the disclosure, based on the touch area touched by the user on the display 410 not corresponding to the first area corresponding to the fingerprint sensor 420 in the display 410, the processor 440 may identify whether the touch area corresponds to a second area (hereinafter, referred to as a "second area") in the display 410.

In an embodiment of the disclosure, the second area may be an area in which the authentication can be performed using the fingerprint sensor 420 by sliding the second housing with respect to the first housing (e.g., relative to the first housing) (e.g., by sliding the second housing with respect to the first housing) (e.g., an area in which the user's fingerprint can be sensed using the fingerprint sensor 420 by sliding the second housing).

In an embodiment of the disclosure, the second area may be set to differ depending on the state of the electronic device 401 (e.g., the position of the second housing relative to the first housing). Hereinafter, the second area is described with reference to FIG. 9.

In an embodiment of the disclosure, reference numeral 901 of FIG. 9 may indicate the slide-out state of the electronic device 401, reference numeral 902 of FIG. 9 may indicate the slide-in state of the electronic device 401, and reference numeral 903 of FIG. 9 may indicate the intermediate state (an intermediate state between the slide-out state and the slide-in state) of the electronic device 401.

In an embodiment of the disclosure, in reference numeral 901, the processor 440 may display a lock screen 910 including a guide image 911 for fingerprint input through the display 410. In an embodiment of the disclosure, a first area 921 may be a rectangular area having a height h1 and a width w. However, the shape of the first area 921 is not limited to a rectangular shape.

In an embodiment of the disclosure, when the electronic device 401 is touched by the user except for the first area in the display 410 in the current state, the processor 440 may set (or identify or determine) an area capable of obtaining fingerprint information (e.g., a fingerprint image) using the fingerprint sensor 420 by sliding the second housing with respect to the first housing as the second area.

For example, in reference numeral 901, in the slide-out state of the electronic device 401, the processor 440 may set, as the second area, the area 922 having a boundary line in contact with the boundary line of the first area 921 (or in contact with the boundary line of the first area 921) and having a length h2 equal to the distance d1 by which the second housing is slidable in a slidable direction (e.g., the −Y axis direction) and a width equal to the width w of the first area.

For example, as indicated by reference numeral 902, in the slide-in state of the electronic device 401, the processor 440 may set, as the second area, the area 923 having a boundary line in contact with the boundary line of the first area 921 and having a length h2 equal to the distance d1 by which the second housing is slidable in a slidable direction (e.g., the +Y axis direction) and a width equal to the width w of the first area.

For example, in reference numeral 903, in the intermediate state of the electronic device 401, the processor 440 may set an area including the area 924 and the area 925 as the second area. The area 924 may be an area having a boundary line in contact with the boundary line of the first area 921 and having a length h3 equal to the distance d2 by which the second housing is slidable in the +Y axis direction and a width equal to the width w of the first area. The area 925 may be an area having a boundary line in contact with the boundary line of the first area 921, and having a length h4 equal to the distance by which the second housing is slidable in the −Y axis direction and a width equal to the width w of the first area.

In an embodiment of the disclosure, the processor 440 may set the second area corresponding to the current state of the electronic device 401, based on the current state (e.g., the slide-out state, the slide-in state, or the intermediate state) of the electronic device 401.

In an embodiment of the disclosure, the processor 440 may obtain (e.g., measure or calculate) the distance between the position of the second housing in the slide-in state (or slide-out state) and the position of the second housing in the current state of the electronic device 401 (or the distance between the position of the second housing in the slide-out state and the position of the second housing in the current state of the electronic device 401), using the first sensor. The processor 440 may set (or identify or determine) the second area based on the obtained distance (or the distance by which the second housing is slidable, calculated based on the obtained distance).

In an embodiment of the disclosure, before performing the operations of FIG. 5, the processor 440 may map distances by which the second housing is slidable from the position of the second housing in the slide-in state (or the slide-out state) and second areas (e.g., coordinates of the second areas) corresponding to the distances, respectively, and may store the same in the memory 430. For example, the processor 440 may store, in the memory 430, a table in which distances by which the second housing is slidable from the position of the second housing in the slide-in state and the second areas corresponding to the distances, respectively, are mapped.

In an embodiment of the disclosure, the processor 440 may obtain the distance by which the second housing is slidable from the position of the second housing in the slide-in state (or the slide-out state) in the current state of the electronic device 401 using the first sensor, and then may identify the second area mapped to the obtained distance from the memory 430, thereby setting the second area.

In an embodiment of the disclosure, at least part of the operation of setting (or identifying) the second area may be performed before performing the operations of FIG. 5, or may be performed after performing some of the operations of FIG. 5. For example, after displaying the first screen through the display 410, the processor 440 may set the second area based on the current state of the electronic device 401 (or the distance by which the second housing is currently slidable from the position of the second housing in the slide-in state, obtained in the current state of the electronic device 401).

In an embodiment of the disclosure, when the display 410 is touched by the user, the processor 440 may obtain (or detect) the area (touch area) touched by the user using the touch sensor.

In an embodiment of the disclosure, the processor 440 may identify whether the obtained touch area corresponds to the second area. For example, the processor 440 may identify whether at least a portion of the touch area overlaps the second area. The processor 440 may determine that the touch area corresponds to the second area based on at least a portion of the touch area overlapping the first area. The processor 440 may determine that the touch area does not correspond to the first area, based on at least a portion of the touch area not overlapping the second area.

In an embodiment of the disclosure, when at least a portion of the touch area overlaps both the first area and the second area, the processor 440 may determine that the touch area corresponds to the first area and may determine that the touch area does not correspond to the second area. However, the disclosure is not limited thereto. For example, when at least a portion of the touch area overlaps both the first area and the second area, the processor 440 may determine that the touch area does not correspond to the first area, and may determine that the touch area corresponds to the second area.

Although not illustrated in FIG. 9, in an embodiment of the disclosure, the processor 440 may display the second area through the display 410 so that the second area is distinguished from other areas in the display 410. For example, the processor 440 may display an image indicating the second area through the display 410. For example, the processor 440 may display an indication indicating boundary lines of the second area through the display 410. The processor 440 may display the second area through the display 410 so that the color and/or shade of the second area is distinguished from the color and/or shade of another area in the display 410. However, the method for displaying the second area through the display 410 so that the second area is distinguished from other areas in the display 410 is not limited to the above-described examples.

In an embodiment of the disclosure, when it is identified in operation 803 that the touch area does not correspond to the second area, the processor 440 may not perform operations after operation 803.

In operation 805, in an embodiment of the disclosure, based on the touch area touched by the user on the display 410 corresponding to the second area, the processor 440 may control the sliding movement of the second housing so that the first area is located at a position at which the authentication can be performed.

In operation 807, in an embodiment of the disclosure, the processor 440 may perform authentication (e.g., fingerprint authentication) based on fingerprint information obtained using the fingerprint sensor 420, based on the sliding movement of the second housing.

Hereinafter, operations 805 and 807 are described with reference to FIGS. 10 and 11.

FIG. 10 is a view illustrating a method for performing authentication based on a touch area corresponding to a second area, according to an embodiment of the disclosure.

FIG. 11 is a view illustrating a method for performing authentication based on a touch area corresponding to a second area, according to an embodiment of the disclosure.

Referring to FIGS. 10 and 11, in an embodiment of the disclosure, based on the touch area touched by the user on the display 410 corresponding to the second area, the processor 440 may control the driving motor so that the first area is located at a position at which the authentication can be performed by sliding the second housing.

In an embodiment of the disclosure, based on the touch area corresponding to the second area, the processor 440 may control the sliding movement of the second housing so that the position of the first area corresponds to the position of the area being touched by the user (e.g., the area sensed by the touch sensor or the area in which the touch is maintained by the user).

In an embodiment of the disclosure, the processor 440 may determine the direction in which the second housing is to slide, based on the touch area (or the area being touched) and the first area. For example, the processor 440 may determine the direction in which the second housing is to slide by comparing the coordinates of the center of the touch area (e.g., the Y coordinate of the center of the touch area on the axis on which the second housing slides) with the coordinates of the center of the first area (e.g., the Y coordinate of the center of the first area on the axis on which the second housing slides).

In an embodiment of the disclosure, based on the touch area corresponding to the second area, the processor 440 may control the second housing (and the display 410) to slide in the determined direction by the distance between the center of the first area and the center of the touch area.

In an embodiment of the disclosure, based on the touch area corresponding to the second area, the processor 440 may control the sliding movement of the second housing so that the second housing slides in the determined direction by a distance corresponding to a difference between the center of the first area (e.g., the Y-axis coordinate of the center of the first area) and the center of the touch area (e.g., the Y-axis coordinate of the center of the touch area) on the axis (e.g., the Y-axis) on which the second housing slides. For example, in reference numeral 1001 of FIG. 10, the processor 440 may sense (or identify or detect) the touch area 1010 (and the center 1011 of the touch area 1010) touched by a user 1030 using the touch sensor in the slide-out state of the electronic device 401. In reference numerals 1001 and 1002 of FIG. 10, the processor 440 may identify (or calculate) the distance h5 between the center 1011 of the touch area 1010 and the center 912 of the first area 921 (e.g., a difference between the Y-axis coordinate of the center 1011 of the touch area 1010 and the Y-axis coordinate of the center). The processor 440 may control the sliding movement of the second housing so that the second housing is moved by the distance h5 in the −Y axis direction.

In an embodiment of the disclosure, based on the touch area 1010 corresponding to the second area 922, the processor 440 may control the second housing (and the display 410) to slide in the determined direction by the distance between the center of the first area 921 and the point having the greatest touch intensity in the touch area 1010. For example, the processor 440 may identify the point having the greatest touch intensity in the touch area 1010 touched by the user 1030 using the touch sensor. The processor 440 may identify the distance between the center of the first area 921 and the identified point. The processor 440 may control the sliding movement of the second housing so that the second housing slides in the Y-axis direction by the distance.

In an embodiment of the disclosure, the Y-axis coordinate of the area (e.g., the touch area 1010) (hereinafter, referred to as a "first touch area") touched by the user before the second housing slides may be substantially the same as the Y-axis coordinate of the area (or the area in which the touch is maintained) (e.g., a touch area 1020) (hereinafter, referred to as a "second touch area") touched by the user while the second housing slides or after the second housing slides. For example, when the user's finger does not move in the Y-axis direction (e.g., the +Y-axis direction or the −Y-axis direction) while the second housing slides, the Y-axis coordinate of the first touch area 1010 and the Y-axis coordinate of the second touch area 1020 may be substantially the same.

On the other hand, when the user's finger moves in the Y-axis direction while the second housing slides, the Y-axis coordinate of the first touch area 1010 and the Y-axis coordinate of the second touch area 1020 may be different. In an embodiment of the disclosure, the processor 440 may control the sliding movement of the second housing so that the Y-axis coordinates of the touch areas (e.g., the first touch area 1010 and the second touch area 1020) before and after the sliding movement of the second housing are the same. For example, based on the first touch area 1010 corresponding to the second area 922, the processor 440 may control the sliding movement of the second housing until the center of the first area 921 (e.g., the Y-axis coordinate of the center of the first area 921) substantially matches a center 1021 of the second touch area 1020 (e.g., the Y-axis coordinate of the center 1021 of the second touch area 1020).

Although FIG. 10 illustrates an example of an operation of controlling the sliding movement of the second housing based on the touch area 1010 corresponding to the second area 922 in the slide-out state of the electronic device 401, the disclosure is not limited thereto. In an embodiment of the disclosure, the processor 440 may control the sliding movement of the second housing based on the touch area corresponding to the second area in the slide-in state or the intermediate state of the electronic device 401. For example, in reference numeral 1101 of FIG. 11, in the slide-in state of the electronic device 401, the processor 440 may sense the touch area 1110 (and the center 1111 of the touch area 1110) (or the point having the greatest touch intensity in the touch area 1110) touched by the user 1030. In reference numerals 1101 and 1102 of FIG. 11, the processor 440 may identify a distance h6 between the center 1111 of the touch area 1110 (or the point having the greatest touch intensity in the touch area 1110) and the center 912 of the first area 921. The processor 440 may control the sliding movement of the second housing so that the second housing is moved by the distance h6 in the +Y axis direction.

In an embodiment of the disclosure, the processor 440 may control the sliding movement of the second housing so that the Y-axis coordinates of the touch areas (e.g., the first touch area 1110 and a second touch area 1120 with a center 1121) before and after the sliding movement of the second housing are the same. For example, based on the first touch area 1110 corresponding to the second area 923, the processor 440 may control the sliding movement of the second housing until the center 912 of the first area 921 (e.g., the Y-axis coordinate of the center 912 of the first area 921) substantially matches the center 1021 of the second touch area 1020 (e.g., the Y-axis coordinate of the center 1021 of the second touch area 1020).

In an embodiment of the disclosure, the processor 440 may obtain fingerprint information using the fingerprint sensor 420 after the sliding movement of the second housing. The processor 440 may perform authentication (e.g., fingerprint authentication) on the obtained fingerprint information. The operation in which the processor 440 obtains fingerprint information using the fingerprint sensor 420 and the operation in which the processor 440 performs authentication based on the fingerprint information are at least partially identical or similar to the above-described operations 603 and 605, and thus a detailed description thereof is omitted.

In an embodiment of the disclosure, the processor 440 may perform an operation related to the authentication based on the success in the authentication. For example, in reference numeral 1003 of FIG. 10 and reference numeral 1103 of FIG. 11, the processor 440 may unlock the lock set on the lock screen 910 based on success in authentication. As shown in reference numerals 1003 and 1103, after unlocking the set lock screen 910, the processor 440 may display a home screen (e.g., a home screen 1130) including application icons (e.g., icons 1031 or the icons 1131) through the display 410.

In an embodiment of the disclosure, as shown in reference numerals 1002 and 1003 (and reference numerals 1102 and 1103), the processor 440 may perform authentication based on the touch area corresponding to the second area, and when the performed authentication is successful, the processor 440 may maintain the state of the electronic device 401 after the sliding movement of the second housing. However, the disclosure is not limited thereto. For example, the user's intention to touch the second area may be to perform fingerprint authentication based on the sliding movement of the second housing and to use the electronic device 401 in the state of the electronic device 401 after the sliding movement of the second housing based on the success in the fingerprint authentication. Accordingly, the processor 440 may allow the second housing to maintain the position after the sliding movement of the second housing without moving the second housing back to the position before the sliding movement after the fingerprint authentication is successful. However, the disclosure is not limited thereto. For example, the processor 440 may control the driving motor so that the second housing moves back to the position before the sliding movement after the fingerprint authentication is successful.

In an embodiment of the disclosure, the processor 440 may display various information through the display 410 while performing an operation of performing authentication based on the touch area corresponding to the second area. Hereinafter, an operation of displaying various information through the display 410 is described with reference to FIGS. 12 and 13.

Figure 12:
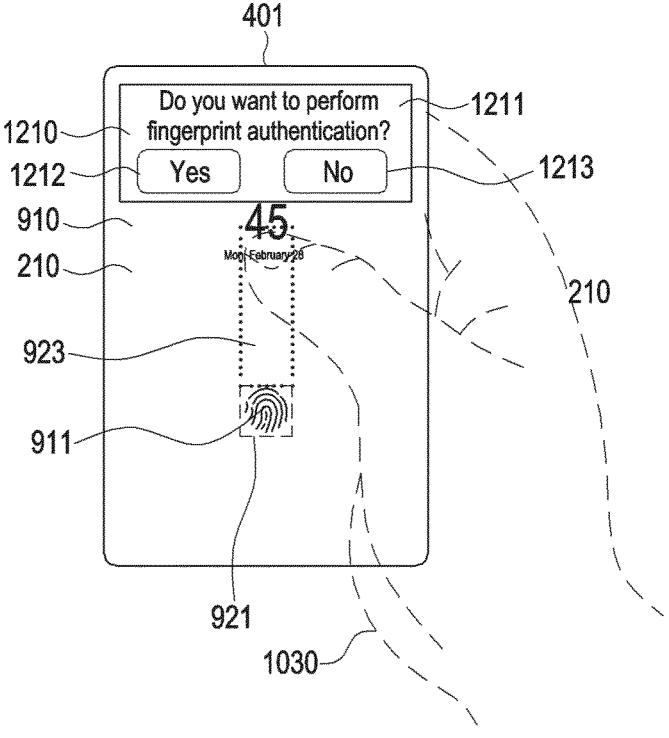
FIG. 12 is a view illustrating a method for outputting information inquiring whether to perform fingerprint authentication, based on a touch area corresponding to a second area, according to an embodiment of the disclosure.

FIG. 12 is a view illustrating a method for outputting information inquiring whether to perform fingerprint authentication, based on a touch area corresponding to a second area, according to an embodiment of the disclosure.

Referring to FIG. 12, in an embodiment of the disclosure, based on the touch area touched by the user on the display 410 corresponding to the second area, the processor 440 may display, through the display 410, information inquiring the user whether to perform fingerprint authentication before controlling the sliding movement of the second housing. For example, in FIG. 12, in the slide-in state of the electronic device 401, based on the touch area corresponding to the second area 923, before controlling the sliding movement of the second housing, the processor 440 may display, through the display 410, a pop-up window 1210 including a text 1211 inquiring the user whether to perform fingerprint authentication, such as "Do you want to perform fingerprint authentication?", an object 1212 for receiving a user input for performing fingerprint authentication, and an object 1213 for receiving a user input not to perform fingerprint authentication. However, the method for displaying information inquiring the user whether to perform fingerprint authentication is not limited to the pop-up type. After displaying the window 1210, the processor 440 may control the sliding movement of the second housing so that the first area corresponds to the touch area based on a user input to the object 1212. After displaying the window 1210, the processor 440 may not control the sliding movement of the second housing based on a user input to the object 1213. In the above-described example, information inquiring the user whether to perform fingerprint authentication is displayed through the display 410, but the disclosure is not limited thereto. For example, the processor 440 may output audio information inquiring the user about whether to perform fingerprint authentication through a speaker. After outputting the audio information inquiring the user whether to perform fingerprint authentication, the processor 440 may determine whether to control the sliding movement of the second housing so that the first area corresponds to the touch area, based on the user's voice input (e.g., a voice input including content agreeing to the operation of performing fingerprint authentication or a voice input including content disagreeing to the operation of performing fingerprint authentication) input through the microphone.

Figure 13:
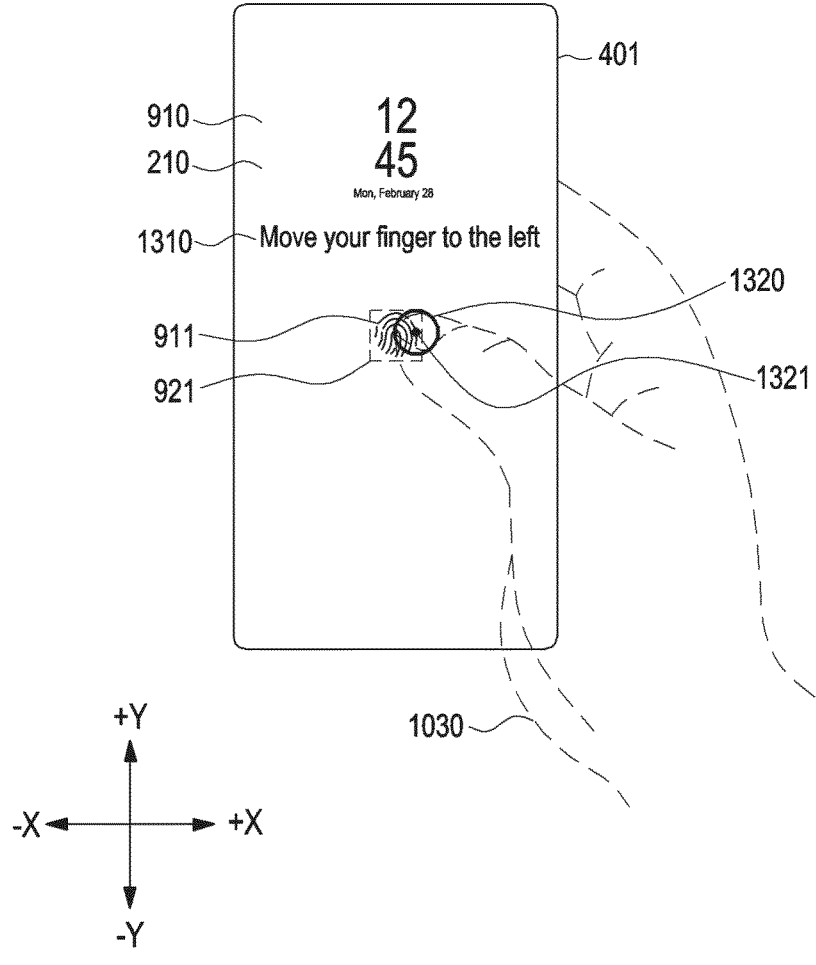
FIG. 13 is a view illustrating a method for outputting information for guiding to a fingerprint input position, based on a touch area corresponding to a second area, according to an embodiment of the disclosure.

FIG. 13 is a view illustrating a method for outputting information for guiding to a fingerprint input position, based on a touch area corresponding to a second area, according to an embodiment of the disclosure.

Referring to FIG. 13, in an embodiment of the disclosure, the processor 440 may control the sliding movement of the second housing so that the first area is located at a position at which the fingerprint authentication can be performed. The processor 440 may display information for guiding to move the position of the touch area being touched by the user on the display 410 for fingerprint input based on a failure in fingerprint authentication performed after the second housing slides.

In an embodiment of the disclosure, when the area overlapping the first area is small in the touch area (e.g., the second touch area) after the sliding movement of the second housing, fingerprint authentication may fail. For example, when there is a large difference between the X-axis coordinate of the center of the touch area and the Y-axis coordinate of the center of the first area after the sliding movement of the second housing, even though the Y-axis coordinate of the center of the touch area and the Y-axis coordinate of the center of the first area match after the sliding movement of the second housing, fingerprint authentication may fail.

In an embodiment of the disclosure, based on the fingerprint authentication failing after the sliding movement of the second housing, the processor 440 may display information for guiding to move the position of the fingerprint of the user in a direction in which the center of the touch area being touched by the user faces the center of the first area on the display 410. For example, in FIG. 13, based on the touch area corresponding to the second area, the processor 440 may control the sliding movement of the second housing so that the Y-axis coordinate of the center 1321 of the area 1320 being touched and the Y-axis coordinate of the center of the first area 921 substantially match, and then perform fingerprint authentication using the fingerprint sensor 420. Based on the failure in the fingerprint authentication, the processor 440 may display, through the display 410, information 1310 (e.g., information for guiding the user to move the finger to the left) for guiding to the position of the fingerprint input of the user so that the X-axis coordinate of the center 1321 of the area 1320 being touched and the X-axis coordinate of the center of the first area 921 substantially match each other. However, the disclosure is not limited thereto. For example, the processor 440 may output, through the speaker, information for guiding to the fingerprint input position in an audio format.

Figure 14:
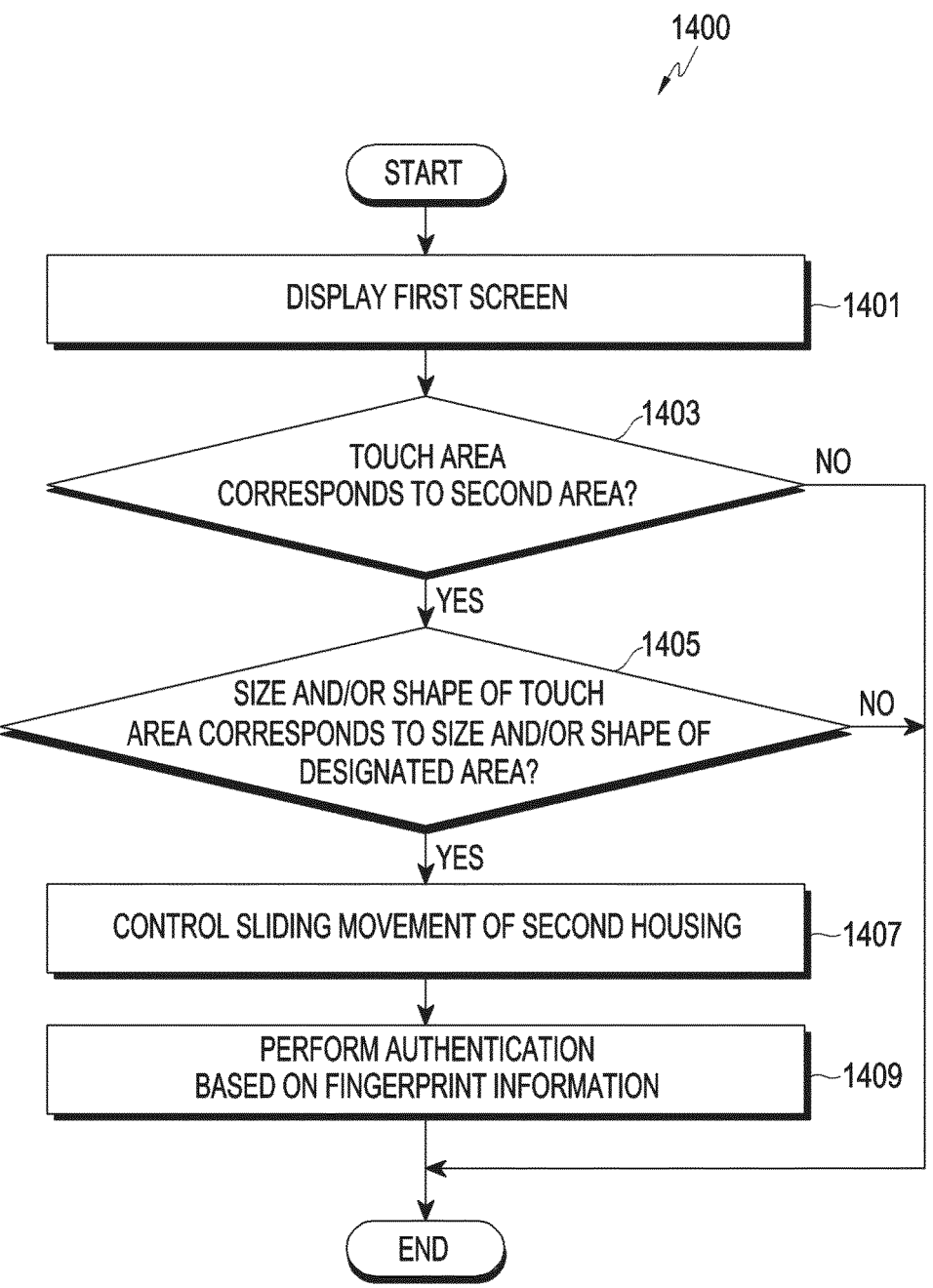
FIG. 14 is a flowchart illustrating a method for performing authentication based on a touch area corresponding to a second area, according to an embodiment of the disclosure.

FIG. 14 is a flowchart 1400 illustrating a method for performing authentication based on a touch area corresponding to a second area, according to an embodiment of the disclosure.

Figure 15:
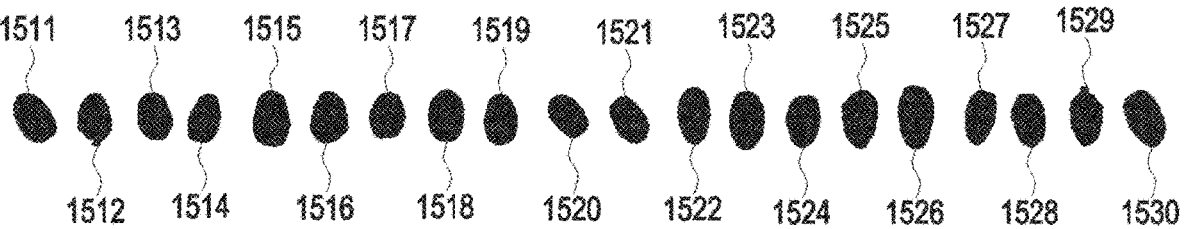
FIG. 15 is a view illustrating a method for obtaining a designated area, according to an embodiment of the disclosure of the disclosure.

FIG. 15 is a view illustrating a method for obtaining a designated area, according to an embodiment of the disclosure.

Referring to FIGS. 14 and 15, in operation 801, in an embodiment of the disclosure, the processor 440 may display a first screen related to authentication through the display 410.

Operation 1401 is at least partially identical or similar to operation 601 of FIG. 6 or operation 801 of FIG. 8, and thus a detailed description thereof is omitted.

In operation 1403, in an embodiment of the disclosure, based on the touch area touched by the user on the display 410 not corresponding to the first area corresponding to the fingerprint sensor 420 in the display 410, the processor 440 may identify whether the touch area corresponds to the second area in the display 410.

Since operation 1403 is at least partially the same or similar to the operation 803 of FIG. 8, no detailed description thereof is presented below.

In an embodiment of the disclosure, when it is identified in operation 1403 that the touch area does not correspond to the second area, the processor 440 may not perform operations after operation 1403.

In operation 1405, in an embodiment of the disclosure, based on the touch area touched by the user on the display 410 corresponding to the second area, the processor 440 may identify whether the size and/or shape of the touch area corresponds to the size and/or shape of the designated area (hereinafter, referred to as a "designated area").

In an embodiment of the disclosure, the size of the touch area may include the area of the touch area. The shape of the touch area may include the shape (e.g., the edge of the touch area) of the touch area when touched by the user, pressures of respective points included in the touch area when touched by the user, and/or the distribution of touch intensity in the touch area when touched by the user. However, the size and shape of the touch area are not limited to the above-described examples.

In an embodiment of the disclosure, the designated area having the size and/or shape compared to the size and/or shape of the touch area may be obtained based on touch areas (e.g., a set of the touch areas) obtained through the touch sensor during fingerprint authentication by the user's fingerprint input for a designated period (e.g., a period of about one year, one month, or one week before the current time) and/or a designated number of times (e.g., about 100 times or about 1000 times). For example, in FIG. 15, the processor 440 may store, in the memory 430, touch areas 1511, 1512, 1513, 1514, 1515, 1516, 1517, 1518, 1519, 1520, 1521, 1522, 1523, 1524, 1525, 1526, 1527, 1528, 1529, and 1530 obtained through the touch sensor during fingerprint authentication by a fingerprint input using the touch sensor during the designated period and/or the designated number of times. In an embodiment of the disclosure, the processor 440 may obtain (e.g., generate) the designated area using an artificial intelligence model or a designated algorithm, based on the obtained touch areas. For example, the processor 440 may obtain a designated area having a size and/or shape compared with the size and/or shape of the touch area by learning the obtained touch areas (e.g., the sizes and/or shapes of the obtained touch areas) using an artificial intelligence model. For example, the processor 440 may obtain a designated area having a size and/or shape compared with the size and/or shape of the touch area by analyzing the obtained touch areas (e.g., the sizes and/or shapes of the obtained touch areas) using a designated algorithm.

In an embodiment of the disclosure, the size of the designated area may include the area of the designated area. The shape of the designated area may include the shape of the designated area, pressures (e.g., information about the pressures) of respective points included in the designated area, and/or the distribution of touch intensity in the designated area. However, the size and shape of the designated area are not limited to the above-described examples.

In an embodiment of the disclosure, the operation of obtaining (e.g., generating) the designated area may be performed before operation 1401 is performed.

In an embodiment of the disclosure, the processor 440 may identify whether the size and/or shape of the touch area corresponds to the size and/or shape of the designated area by comparing the similarity between the size and/or shape of the touch area and the size and/or shape of the designated area with a threshold similarity. For example, the processor 440 may identify that the size and/or shape of the touch area corresponds to the size and/or shape of the designated area, based on identifying that the similarity between the size and/or shape of the touch area and the size and/or shape of the designated area is equal to or larger than the threshold similarity. For example, the processor 440 may identify that the size and/or shape of the touch area does not correspond to the size and/or shape of the designated area, based on identifying that the similarity between the size and/or shape of the touch area and the size and/or shape of the designated area is less than the threshold similarity.

In an embodiment of the disclosure, the processor 440 may not perform operations 1407 and 1409, based on identifying that the size and/or shape of the touch area does not correspond to the size and/or shape of the designated area in operation 1405.

In operation 1407, in an embodiment of the disclosure, based on identifying that the size and/or shape of the touch area corresponds to the size and/or shape of the designated area, the processor 440 may control the sliding movement of the second housing so that the first area is located at a position at which the authentication can be performed.

In operation 1409, in an embodiment of the disclosure, the processor 440 may perform authentication (e.g., fingerprint authentication) based on fingerprint information obtained using the fingerprint sensor 420, based on the sliding movement of the second housing.

The operation of controlling the sliding movement of the second housing and the operation of performing authentication in operation 1409 so that the first area is located at a position at which the authentication can be performed in operation 1407 are at least partially identical or similar to operation 805, operation 807, and the operations described with reference to FIGS. 10 and 11, and thus a detailed description thereof is omitted.

Figure 16:
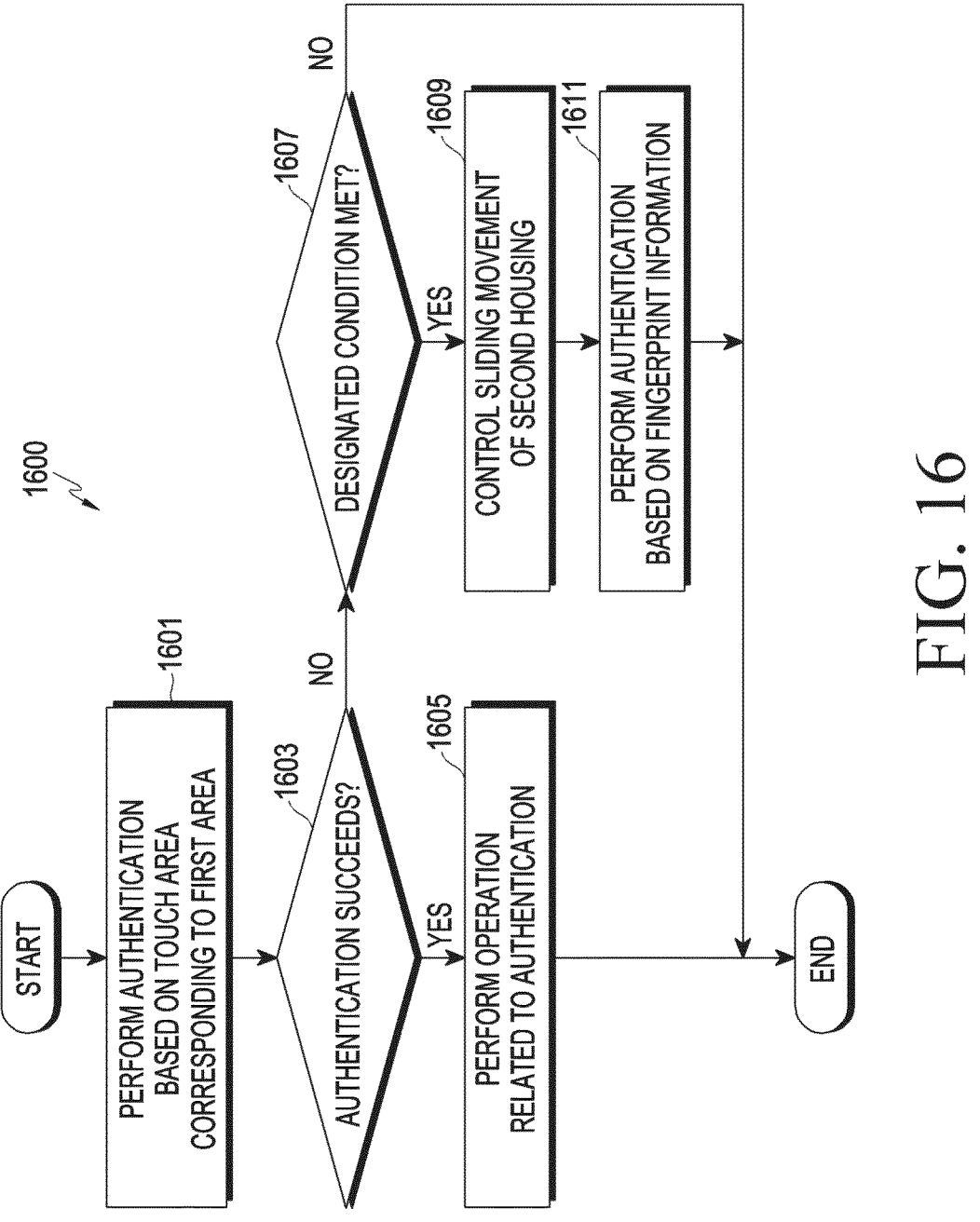
FIG. 16 is a flowchart illustrating a method for performing authentication based on a touch area corresponding to a first area, according to an embodiment of the disclosure.

FIG. 16 is a flowchart 1600 illustrating a method for performing authentication based on a touch area corresponding to a first area, according to an embodiment of the disclosure.

Referring to FIG. 16, in operation 1601, in an embodiment of the disclosure, the processor 440 may perform authentication using the fingerprint sensor 420, based on the touch area touched by the user on the display 410 corresponding to the first area corresponding to the fingerprint sensor 420 in the display 410.

Operation 1601 is at least partially identical or similar to operation 501 of FIG. 5, and thus a detailed description thereof is omitted.

In operation 1603, in an embodiment of the disclosure, the processor 440 may identify whether the authentication succeeds (or fails). For example, the processor 440 may identify whether fingerprint authentication performed based on the touch area corresponding to the first area is successful.

In operation 1605, in an embodiment of the disclosure, the processor 440 may perform an operation related to the authentication (e.g., unlock the electronic device 401), based on identifying that the authentication is successful in operation 1603.

In operation 1607, in an embodiment of the disclosure, the processor 440 may identify whether the fingerprint information obtained by the fingerprint sensor 420 meets a designated condition, based on identifying that the authentication fails in operation 1603.

In an embodiment of the disclosure, when the similarity between the feature points extracted from the fingerprint information and the features of the registered fingerprint information is less than a first similarity required for succeeding in fingerprint authentication and is larger than or equal to a second similarity lower than the first similarity, when the number of feature points extracted from the fingerprint information is larger than or equal to a designated number, when the feature points are extracted from the fingerprint information, and/or when it is identified that the touch area touched by the user on the display 410 is obtained by the touch by the user's fingerprint, the processor 440 may identify that the fingerprint information obtained by the fingerprint sensor 420 meets the designated condition.

In an embodiment of the disclosure, when the fingerprint information obtained by the fingerprint sensor 420 in operation 1607 does not meet the designated condition, the processor 440 may not perform an additional operation.

In operation 1609, in an embodiment of the disclosure, when the fingerprint information obtained by the fingerprint sensor 420 in operation 1607 meets the designated condition, the processor 440 may control the sliding movement of the second housing so that fingerprint information more than the fingerprint information used for the authentication (e.g., the failed authentication) is obtained.

In operation 1611, in an embodiment of the disclosure, the processor 440 may perform authentication (e.g., fingerprint authentication) based on fingerprint information obtained using the fingerprint sensor 420, based on the sliding movement of the second housing.

Hereinafter, operation 1609 and operation 1611 are described with reference to FIGS. 17 and 18.

Figure 17:
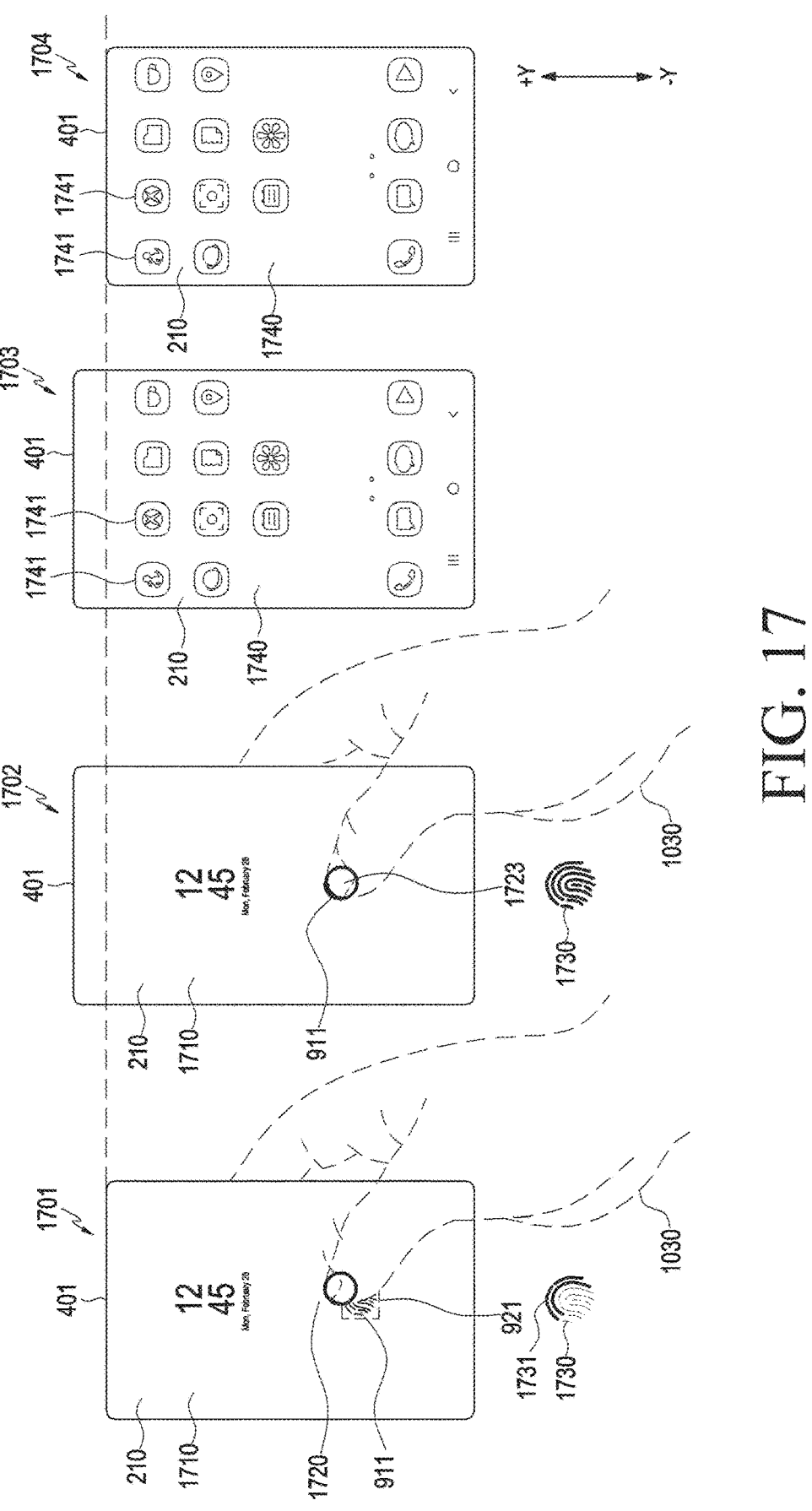
FIG. 17 is a view illustrating a method for performing authentication based on a touch area corresponding to a first area, according to an embodiment of the disclosure.

FIG. 17 is a view illustrating a method for performing authentication based on a touch area corresponding to a first area, according to an embodiment of the disclosure.

Figure 18:
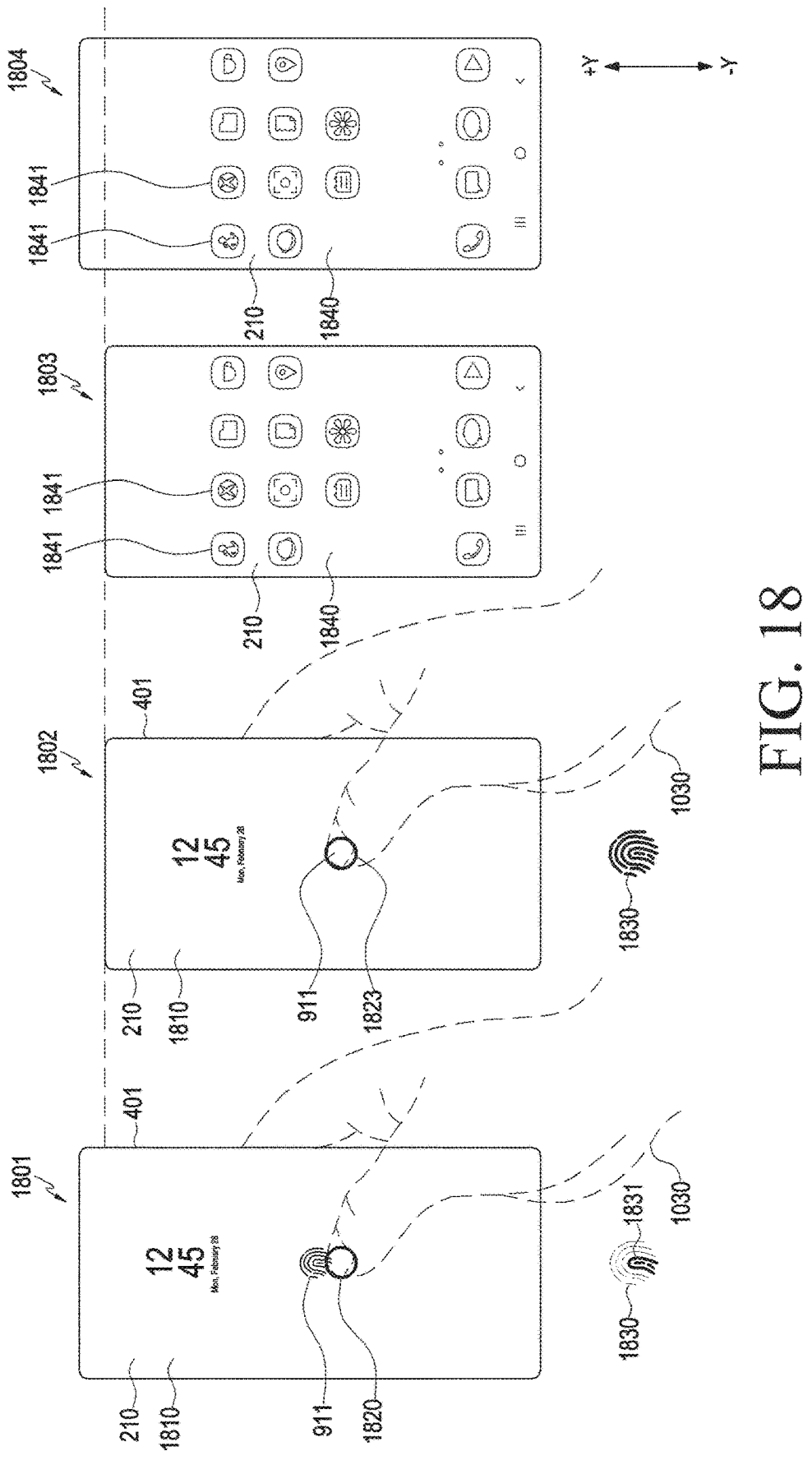
FIG. 18 is a view illustrating a method for performing authentication based on a touch area corresponding to a first area, according to an embodiment of the disclosure.

FIG. 18 is a view illustrating a method for performing authentication based on a touch area corresponding to a first area, according to an embodiment of the disclosure.

Referring to FIGS. 17 and 18, in an embodiment of the disclosure, in reference numeral 1701 of FIG. 17, the processor 440 may display a lock screen 1710 including a guide image 911 for fingerprint input through the display 410. The processor 440 may perform authentication using the fingerprint sensor 420 based on the touch area 1720 touched by the user on the display 410 corresponding to the first area 921 corresponding to the fingerprint sensor 420 in the display 410. Based on identifying that the authentication fails, the processor 440 may identify whether the fingerprint information obtained by the fingerprint sensor 420 meets a designated condition.

In an embodiment of the disclosure, when the similarity between the feature points extracted from the fingerprint information (e.g., the fingerprint information obtained using the fingerprint sensor 420) and the features of the registered fingerprint information is less than a first similarity required for succeeding in fingerprint authentication and is larger than or equal to a second similarity lower than the first similarity, when the number of feature points extracted from the fingerprint information is larger than or equal to a designated number, when the feature points are extracted from the fingerprint information, and/or when it is identified that the touch area touched by the user on the display 410 is obtained by the touch by the user's fingerprint, the processor 440 may identify that the fingerprint information obtained by the fingerprint sensor 420 meets the designated condition.

In an embodiment of the disclosure, based on identifying that the obtained fingerprint information meets the designated condition (or while performing the operation of identifying whether the obtained fingerprint information meets the designated condition), the processor 440 may identify the area in which the fingerprint information is obtained using the fingerprint sensor 420 in the first area. Based on identifying the area in which the fingerprint information is obtained using the fingerprint sensor 420 in the first area, the processor 440 may display, through the display 410, a virtual fingerprint image 1730 to allow the area 1731 (e.g., an upper end portion of the first area) in which the fingerprint information is obtained in the virtual fingerprint image 1730 (or the virtual fingerprint image indicating the first area) corresponding to the first area to have a color or darkness level different from that of the other area so that the user may be aware of the area (or the area being touched) in which fingerprint information is obtained in the first area.

In an embodiment of the disclosure, the processor 440 may identify an area similar to the obtained fingerprint information in the registered fingerprint information, based on the fingerprint information obtained using the fingerprint sensor 420 and the registered fingerprint information. For example, the processor 440 may compare the feature points of the fingerprint information obtained using the fingerprint sensor 420 with the feature points of the registered fingerprint information, thereby identifying first feature points (hereinafter, also referred to as "first feature points") that are substantially the same as the feature points of the obtained fingerprint information among all the feature points of the registered fingerprint information. The processor 440 may identify an area (e.g., a set of positions of the first feature points) of the identified first feature points within registered fingerprint information (e.g., a registered fingerprint image).

In an embodiment of the disclosure, the processor 440 may determine the direction in which the second housing is to slide, based on the touch area (or the area being touched) or the fingerprint information obtained using the fingerprint sensor 420. For example, in reference numeral 1701, the processor 440 may determine the moving direction of the second housing as the +Y axis direction, based on identifying that the position of the area overlapping the touch area 1720 in the first area 921 is an upper end portion of the first area 921. For example, the processor 440 may determine the moving direction of the second housing as the +Y axis direction based on identifying that the identified area of the first feature points in the registered fingerprint information (e.g., the registered fingerprint image) is a lower end portion in the registered fingerprint information.

In an embodiment of the disclosure, the processor 440 may control the sliding movement of the second housing to obtain more fingerprint information than the fingerprint information. For example, comparing reference numerals 1701 and 1702, the processor 440 may control the driving motor to slide the second housing so that more fingerprint information (e.g., many feature points) is obtained than the fingerprint information obtained using the fingerprint sensor 420 in the first touch area 1720 touched by the user before the second housing slides. For example, the processor 440 may control the driving motor to slide the second housing so that the center of the first area substantially matches the center of the first touch area 1720. For example, as indicated by reference numeral 1702, the processor 440 may control the driving motor to slide the second housing so that the center of the first area substantially matches the center of a second touch area 1723 being touched by the user while the second housing slides or after the second housing slides.

In an embodiment of the disclosure, after the second housing slides (e.g., after the second housing slides so that the center of the first area substantially matches the center of the first touch area 1720), the processor 440 may obtain fingerprint information using the fingerprint sensor 420.

In an embodiment of the disclosure, based on determining the direction in which the second housing is to slide, the processor 440 may control the driving motor to slide the second housing gradually (or at a designated distance interval at a designated time interval) in the determined direction. The processor 440 may obtain a plurality of fingerprint information (e.g., a plurality of fingerprint images) using the fingerprint sensor 420 while the second housing is moved in the determined direction.

In an embodiment of the disclosure, based on determining the direction in which the second housing is to slide, the processor 440 may control the driving motor to slide the second housing by a designated distance gradually (or at a designated distance interval) in the determined direction.

In an embodiment of the disclosure, as indicated by reference numeral 1702, the processor 440 may display a virtual fingerprint image 1730 through the display 410 so that the user may know that the area in which the fingerprint information is obtained (or the area being touched) corresponds to the first area after the sliding movement of the second housing.

In an embodiment of the disclosure, the processor 440 may perform authentication related to the first screen after the second housing slides. The processor 440 may perform an operation related to authentication based on success in authentication. For example, in reference numeral 1703, the processor 440 may unlock the lock screen 1710. After unlocking the lock screen 1710, the processor 440 may display a home screen 1740 including application icons (e.g., icons 1741) through the display 410.

In an embodiment of the disclosure, the processor 440 may control the driving motor to slide the second housing to a position before the sliding movement of the second housing after performing the operation related to authentication (e.g., after unlocking the lock screen), based on success in the authentication after the sliding movement of the second housing. For example, when comparing reference numeral 1702 and/or reference numeral 1703 with reference numeral 1704, the processor 440 may control the driving motor to slide the second housing back to the position of the second housing of reference numeral 1701, based on success in authentication after the second housing slides.

Although FIG. 17 illustrates an example in which the second housing slides in the +Y axis direction, the disclosure is not limited thereto. An example in which the second housing slides in the −Y-axis direction is described with reference to FIG. 18.

In an embodiment of the disclosure, as indicated by reference numeral 1801 of FIG. 18, the processor 440 may display a lock screen 1810 including a guide image 911 for fingerprint input through the display 410. The processor 440 may perform authentication using the fingerprint sensor 420 based on the touch area 1820 touched by the user on the display 410 corresponding to the first area 921 corresponding to the fingerprint sensor 420 in the display 410. Based on identifying that the authentication fails, the processor 440 may identify whether the fingerprint information obtained by the fingerprint sensor 420 meets a designated condition.

In an embodiment of the disclosure, based on identifying that the obtained fingerprint information meets the designated condition (or while performing the operation of identifying whether the obtained fingerprint information meets the designated condition), the processor 440 may identify the area in which the fingerprint information is obtained using the fingerprint sensor 420 in the first area. Based on identifying the area in which the fingerprint information is obtained using the fingerprint sensor 420 in the first area, the processor 440 may display, through the display 410, a virtual fingerprint image 1830 to allow the area 1831 (e.g., a lower end portion of the first area) in which the fingerprint information is obtained in the virtual fingerprint image 1830 (or the virtual fingerprint image indicating the first area) corresponding to the first area to have a color or darkness level different from that of the other area so that the user may be aware of the area (or the area being touched) in which the fingerprint information is obtained in the first area.

In an embodiment of the disclosure, the processor 440 may identify an area similar to the obtained fingerprint information in the registered fingerprint information, based on the fingerprint information obtained using the fingerprint sensor 420 and the registered fingerprint information.

In an embodiment of the disclosure, the processor 440 may determine the direction in which the second housing is to slide, based on the touch area (or the area being touched) or the fingerprint information obtained using the fingerprint sensor 420. For example, in reference numeral 1801, the processor 440 may determine the moving direction of the second housing as the −Y-axis direction, based on identifying that the position of the area overlapping the touch area 1820 in the first area 921 is a lower end portion of the first area 921. For example, the processor 440 may determine the moving direction of the second housing as the −Y axis direction based on identifying that the identified area of the first feature points in the registered fingerprint information (e.g., the registered fingerprint image) is an upper end portion in the registered fingerprint information.

In an embodiment of the disclosure, the processor 440 may control the sliding movement of the second housing to obtain more fingerprint information than the fingerprint information. For example, comparing reference numerals 1801 and 1802, the processor 440 may control the driving motor to slide the second housing so that more fingerprint information (e.g., many feature points) is obtained than the fingerprint information obtained using the fingerprint sensor 420 in the first touch area 1820 touched by the user before the second housing slides. For example, the processor 440 may control the driving motor to slide the second housing so that the center of the first area substantially matches the center of the first touch area 1820. For example, as indicated by reference numeral 1802, the processor 440 may control the driving motor to slide the second housing so that the center of the first area substantially matches the center of the second touch area 1823 being touched by the user while the second housing slides or after the second housing slides.

In an embodiment of the disclosure, after the second housing slides (e.g., after the second housing slides so that the center of the first area substantially matches the center of the first touch area 1820), the processor 440 may obtain fingerprint information using the fingerprint sensor 420.

In an embodiment of the disclosure, based on determining the direction in which the second housing is to slide, the processor 440 may control the driving motor to slide the second housing by a designated distance gradually (or at a designated distance interval) in the determined direction. The processor 440 may obtain a plurality of fingerprint information (e.g., a plurality of fingerprint images) using the fingerprint sensor 420 while the second housing is moved in the determined direction.

In an embodiment of the disclosure, based on determining the direction in which the second housing is to slide, the processor 440 may control the driving motor to slide the second housing by a designated distance gradually (or at a designated distance interval) in the determined direction.

In an embodiment of the disclosure, as indicated by reference numeral 1802, the processor 440 may display a virtual fingerprint image 1830 through the display 410 so that the user may know that the area in which the fingerprint information is obtained (or the area being touched) corresponds to the first area after the sliding movement of the second housing.

In an embodiment of the disclosure, the processor 440 may perform authentication related to the first screen after the second housing slides. The processor 440 may perform an operation related to authentication based on success in authentication. For example, in reference numeral 1803, the processor 440 may unlock the lock screen 1810. After unlocking the lock screen 1810, the processor 440 may display a home screen 1840 including application icons (e.g., icons 1841) through the display 410.

In an embodiment of the disclosure, the processor 440 may control the driving motor to slide the second housing to a position before the sliding movement of the second housing after performing the operation related to authentication (e.g., after unlocking the lock screen), based on success in the authentication after the sliding movement of the second housing. For example, when comparing reference numeral 1802 and/or reference numeral 1803 with reference numeral 1804, the processor 440 may control the driving motor to slide the second housing back to the position of the second housing of reference numeral 1801, based on success in authentication after the second housing slides.

In an embodiment of the disclosure, in FIGS. 16 to 18, the user's intention may be to perform authentication using the fingerprint sensor 420 without sliding the second housing. However, when the user's fingerprint does not touch the first area, fingerprint authentication may fail. In this case, when fingerprint authentication is successful due to the sliding movement of the second housing, the second housing may be slid to the position before the sliding movement of the second housing, thereby matching the user's intention. However, the disclosure is not limited thereto. For example, based on success in authentication after the second housing slides, the processor 440 may control the driving motor to maintain the position after the sliding movement without sliding the second housing back to the position before the sliding movement of the second housing.

In the above-described examples, an operation of performing authentication (e.g., fingerprint authentication)

using the fingerprint sensor 420 based on the sliding movement of the second housing has been described, but the processor 440 may perform an operation of registering a fingerprint based on the sliding movement of the second housing. Hereinafter, an operation of registering a fingerprint using a sliding movement of a second housing is described with reference to FIGS. 19 and 20.

Figure 19:
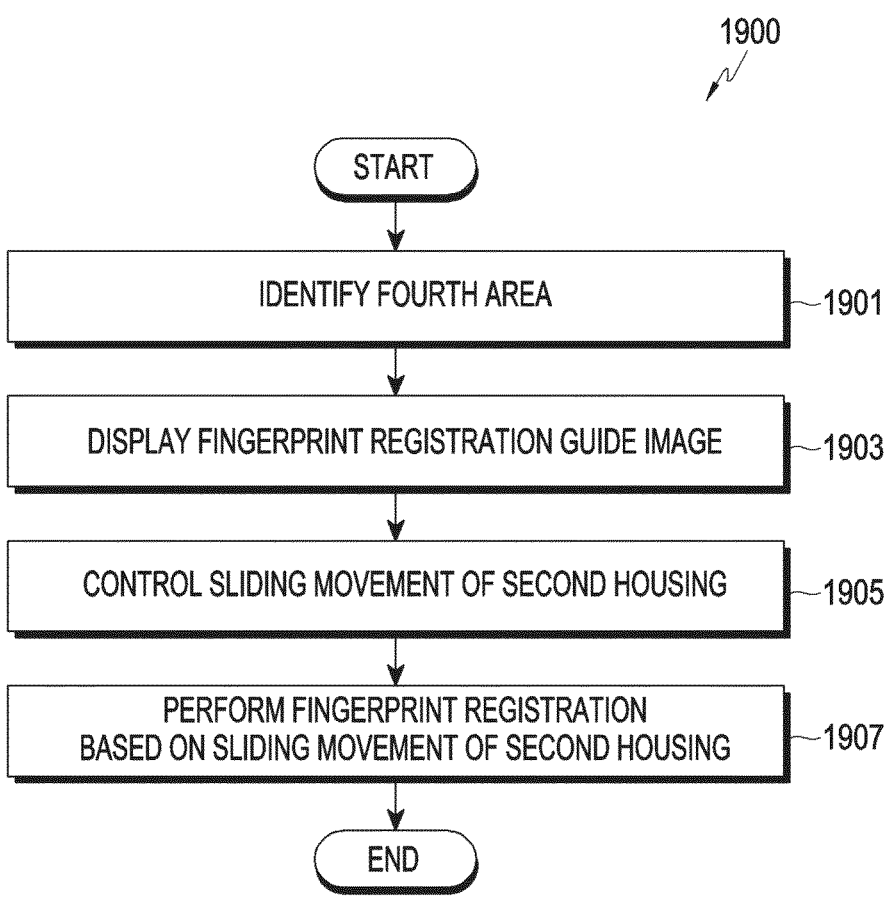
FIG. 19 is a flowchart illustrating a method for registering authentication, according to an embodiment of the disclosure.

FIG. 19 is a flowchart 1900 illustrating a method for registering a fingerprint, according to an embodiment of the disclosure.

Figure 20:
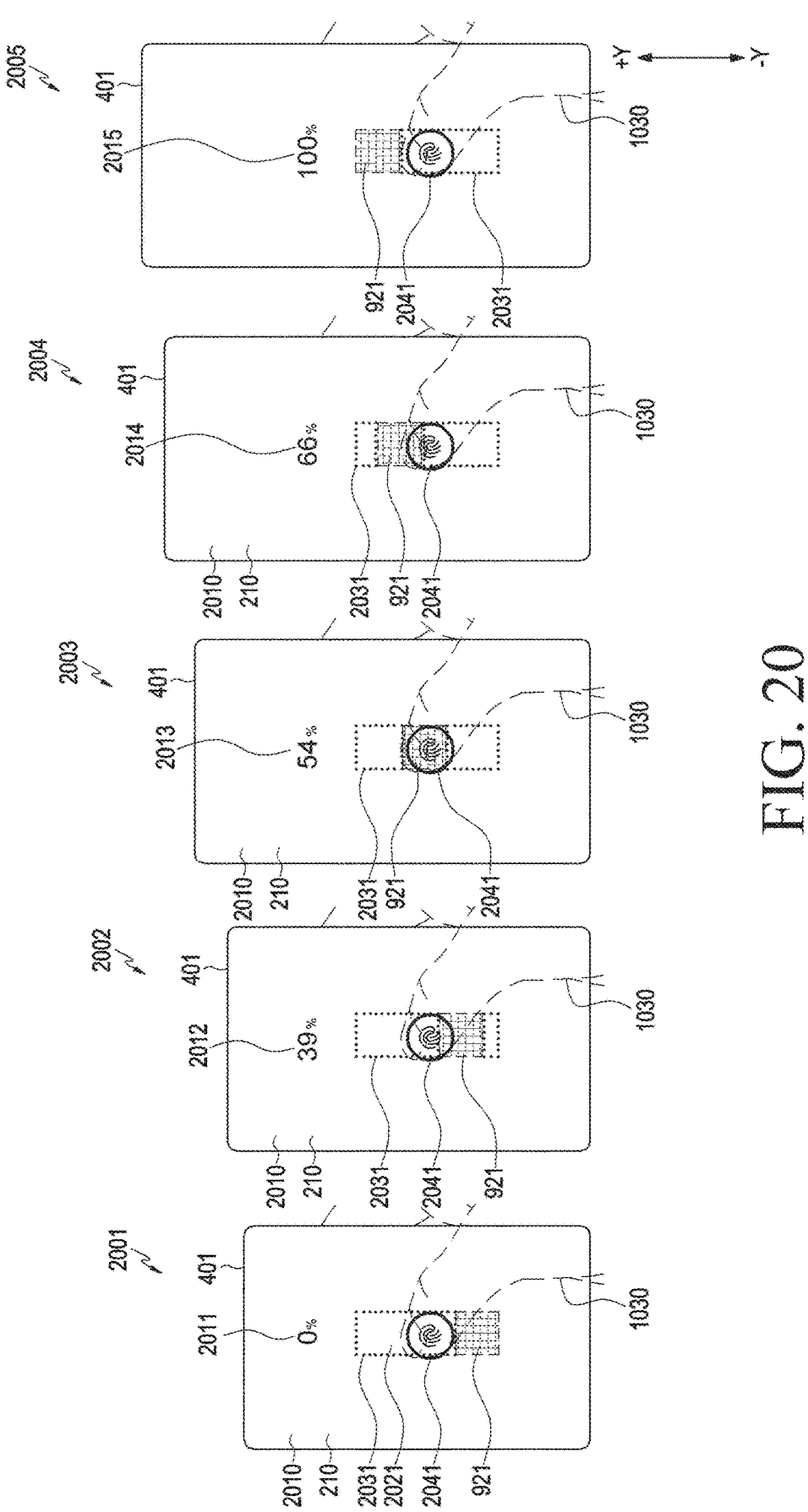
FIG. 20 is a view illustrating a method for registering authentication, according to an embodiment of the disclosure.

FIG. 20 is a view illustrating a method for registering authentication using a fingerprint sensor 420 according to an embodiment of the disclosure.

Referring to FIGS. 19 and 20, in operation 1901, the processor 440 may identify a third area (hereinafter, referred to as a "third area") in which authentication registration can be performed by sliding the second housing and a fourth area (hereinafter, referred to as a "fourth area") including the first area corresponding to the fingerprint sensor 420.

In an embodiment of the disclosure, the processor 440 may set (or identify) a third area at which authentication registration can be performed by sliding the second housing, based on an input for fingerprint registration.

In an embodiment of the disclosure, the third area may be substantially the same area as the second area described above. For example, similar to the second area described with reference to reference numerals 901, 902, and 903, the third area may be an area in which registration (e.g., fingerprint registration) can be performed using the fingerprint sensor 420 by sliding the second housing with respect to the first housing (e.g., by the sliding movement of the second housing with respect to the first housing) (e.g., an area in which the user's fingerprint can be sensed using the fingerprint sensor 420 by sliding the second housing).

In an embodiment of the disclosure, the processor 440 may set the third area corresponding to the current state of the electronic device 401, based on the current state (e.g., the slide-out state, the slide-in state, or the intermediate state) of the electronic device 401. For example, the processor 440 may set (or identify) the third area corresponding to the current state of the electronic device 401 by performing an operation at least partially identical or similar to the operation of setting the second area in FIG. 9.

In operation 1903, in an embodiment of the disclosure, the processor 440 may display a guide image for fingerprint registration (hereinafter, referred to as a "fingerprint registration guide image") through the display 410.

In an embodiment of the disclosure, the processor 440 may display a screen for fingerprint registration including the fingerprint registration guide image through the display 410, based on an input for registering a fingerprint. For example, as indicated by reference numeral 2001 of FIG. 20, the processor 440 may display a screen 2010 for fingerprint registration including the fingerprint registration guide image 2041 through the display 410, based on an input for registering a fingerprint.

In an embodiment of the disclosure, the processor 440 may display the registration guide image in the fourth area through the display 410. For example, as indicated by reference numeral 2001, the processor 440 may display the registration guide image 2041 through the display 410 so that the center of the Y-axis coordinate of the fourth area 2031 including the first area 921 and a third area 2021 is the same as the center the Y-axis coordinate of the registration guide image 2041. However, the position where the registration guide image 2041 is displayed is not limited to the above-described example.

Although not illustrated in FIG. 19, in an embodiment of the disclosure, the processor 440 may display the fourth area through the display 410 so that the fourth area is distinguished from other areas in the display 410. For example, the processor 440 may display an image indicating the fourth area through the display 410. For example, the processor 440 may display an indication indicating boundary lines of the fourth area through the display 410. The processor 440 may display the fourth area through the display 410 so that the color and/or shade of the fourth area is distinguished from the color and/or shade of another area in the display 410. However, the method for displaying the fourth area through the display 410 so that the fourth area is distinguished from other areas in the display 410 is not limited to the above-described examples.

In operation 1905, in an embodiment of the disclosure, based on at least a portion of the touch area touched by the user on the display 410 overlapping the fourth area, the processor 440 may control the sliding movement of the second housing so that fingerprint registration using the fingerprint sensor 420 is performed.

In operation 1907, in an embodiment of the disclosure, the processor 440 may perform fingerprint registration based on the sliding movement of the second housing.

Hereinafter, operations 1905 and 1907 are described with reference to FIG. 20.

In an embodiment of the disclosure, the processor 440 may control the driving motor to slide the second housing, based on at least a portion of the touch area touched by the user on the display 410 overlapping the fourth area. For example, as indicated by reference numeral 2001, the processor 440 may control the driving motor so that the second housing starts the sliding movement based on the area of the fingerprint registration image 2041 displayed in the fourth area being touched by the user.

In an embodiment of the disclosure, as indicated by reference numeral 2001, the processor 440 may determine the direction in which the second housing is to slide based on the touch area (e.g., the center of the touch area) touched by the user in the display 410 and the first area (e.g., the center of the first area) (e.g., by comparing the center of the touch area with the center of the first area).

In an embodiment of the disclosure, in reference numeral 2001, reference numeral 2202, reference numeral 2003, reference numeral 2004, and reference numeral 2005, the processor 440 may control the driving motor so that the second housing gradually slides in the determined direction (e.g., in the +Y axis direction). For example, the processor 440 may control the driving motor to slide the second housing by a designated distance every designated time interval in the determined direction (e.g., in the +Y axis direction).

In an embodiment of the disclosure, the processor 440 may control the driving motor to slide the second housing until the fingerprint registration using the fingerprint sensor 420 is completed. For example, until the fingerprint registration using the fingerprint sensor 420 is completed, the processor 440 may control the driving motor to slide the second housing by reciprocating in the first direction (e.g., the −Y axis direction) in which the second housing slides and the second direction (e.g., the −Y axis direction) opposite to the first direction.

In an embodiment of the disclosure, the processor 440 may obtain a plurality of fingerprint information (e.g., a plurality of fingerprint images) using the fingerprint sensor 420 while the second housing slides. The processor 440 may perform fingerprint registration based on the plurality of pieces of fingerprint information.

In an embodiment of the disclosure, the processor 440 may display information indicating the progress of fingerprint registration through the display 410 while fingerprint registration is performed. For example, the processor 440 may perform a preprocessing operation including a direction component extraction operation, a binarization operation, a smoothing operation, and/or a fine line operation on the fingerprint information (e.g., the fingerprint image) on each of the fingerprint information (e.g., a plurality of fingerprint images sequentially obtained) sequentially obtained by the sliding movement of the second housing. After performing the preprocessing operation on the fingerprint information, the processor 440 may extract feature points from the fingerprint information. The processor 440 may display information 2011, 2012, 2013, 2014, and 2015 indicating progress information about fingerprint registration (e.g., progress rate of fingerprint registration) through the display 410, based on the number (or amount) of the extracted feature points (e.g., the number of feature points accumulated as fingerprint registration proceeds).

An electronic device 401 according to an embodiment may comprise a first housing, a second housing configured to slidably move relative to the first housing, a display 410, wherein a display area of the display 410, which is exposed to an outside of the electronic device 401, can be extended or reduced based on a sliding movement of the second housing, a fingerprint sensor 420 configured to be moved by the sliding movement of the second housing, at least one processor 440 including processing circuitry, and memory 430 storing instructions. The instructions may, when executed by the at least one processor 440 individually or collectively, cause the electronic device 401 to, based on a touch area touched by the user on the display 410 corresponding to a first area corresponding to the fingerprint sensor 420 in the display 410, perform an authentication using the fingerprint sensor 420. The instructions may, when executed by the at least one processor 440 individually or collectively, cause the electronic device 401 to, based on the touch area not corresponding to the first area, control the sliding movement of the second housing so that the first area is located at a position where the authentication can be performed. The instructions may, when executed by the at least one processor 440 individually or collectively, cause the electronic device 401 to, perform the authentication, based on the sliding movement of the second housing.

In an embodiment of the disclosure, the instructions may, when executed by the at least one processor 440 individually or collectively, cause the electronic device 401 to, based on the touch area not corresponding to the first area, identify whether at least a portion of the touch area overlaps a second area in which the authentication can be performed by slidably moving the second housing. The instructions may, when executed by the at least one processor 440 individually or collectively, cause the electronic device 401 to, based on identifying that at least the portion of the touch area overlaps the second area, control the sliding movement of the second housing so that the second housing slidably moves a distance corresponding to a difference between a center of the first area and a center of the touch area on an axis along which the second housing slidably moves.

In an embodiment of the disclosure, the instructions may, when executed by the at least one processor 440 individually or collectively, cause the electronic device 401 to, based on identifying that at least the portion of the touch area overlaps the second area, identify whether a size and/or a form of the touch area corresponds to a size and/or a form of a designated area. The instructions may, when executed by the at least one processor 440 individually or collectively, cause the electronic device 401 to, based on identifying that the size and/or the form of the touch area corresponds to the size and/or the form of the designated area, control the sliding movement of the second housing so that the second housing slidably moves a distance corresponding to a difference between a center of the first area and a center of the touch area on an axis along which the second housing slidably moves.

In an embodiment of the disclosure, the size and/or the form of the designated area may be stored in memory 430 after the size and/or the form of the designated area is obtained using AI (artificial intelligence) model trained based on touch areas in which touch inputs have been obtained when an authentication has been performed using the fingerprint sensor 420.

In an embodiment of the disclosure, the instructions may, when executed by the at least one processor 440 individually or collectively, cause the electronic device 401 to, based on the touch area not corresponding to the first area, control the sliding movement of the second housing so that a position of the first area corresponds to a position of a touch area which is being touched on the display 410.

In an embodiment of the disclosure, the instructions may, when executed by the at least one processor 440 individually or collectively, cause the electronic device 401 to, based on that the authentication performed based on the touch area corresponding to the first area is failed, and fingerprint information used for the authentication meets a designated condition, control the sliding movement of the second housing so that fingerprint information more than the fingerprint information used for the authentication is obtained.

In an embodiment of the disclosure, the instructions may, when executed by the at least one processor 440 individually or collectively, cause the electronic device 401 to, based on that the authentication performed after the sliding movement of the second housing is succeeded, control the second housing to slidably move to a position before the sliding movement of the second housing.

In an embodiment of the disclosure, the instructions may, when executed by the at least one processor 440 individually or collectively, cause the electronic device 401 to, identify a fourth area including the first area corresponding to the fingerprint sensor 420 and a third area in which fingerprint registration can be performed by slidably moving the second housing. The instructions may, when executed by the at least one processor 440 individually or collectively, cause the electronic device 401 to, based on at least a portion of the touch area touched by the user on the display 410 overlapping the fourth area, control the sliding movement of the second housing so that the fingerprint registration is performed using the fingerprint sensor 420.

In an embodiment of the disclosure, the instructions may, when executed by the at least one processor 440 individually or collectively, cause the electronic device 401 to, based on at least the portion of the touch area touched by the user on the display 410 overlapping the fourth area, control the second housing to slidably move a designated distance every designated time interval until the fingerprint registration is completed using the fingerprint sensor 420.

In an embodiment of the disclosure, the instructions may, when executed by the at least one processor 440 individually or collectively, cause the electronic device 401 to, based on that the authentication performed after the sliding movement of the second housing is failed, display, through the display

410, information guiding to move a center of a touch area being touched by the user faces toward a center of the first area.

In an embodiment of the disclosure, a method for performing authentication using a fingerprint sensor 420 in an electronic device 401 may comprise, based on a touch area touched by a user on a display 410 of the electronic device 401 the electronic device 401 corresponding to a first area corresponding to the fingerprint sensor 420 in the display 410, the electronic device 401 comprising a first housing, a second housing configured to slidably move relative to the first housing, the display 410, and the fingerprint sensor 420 configured to be moved by a sliding movement of the second housing, wherein a display area of the display 410, which is exposed to an outside of the electronic device 401, can be extended or reduced based on a sliding movement of the second housing. The method may comprise, based on the touch area not corresponding to the first area, controlling the sliding movement of the second housing so that the first area is located at a position where the authentication may be performed. The method may comprise performing the authentication, based on the sliding movement of the second housing.

In an embodiment of the disclosure, controlling the sliding movement of the second housing may include, based on the touch area not corresponding to the first area, identifying whether at least a portion of the touch area overlaps a second area in which the authentication can be performed by slidably moving the second housing. Controlling the sliding movement of the second housing may include, based on identifying that at least the portion of the touch area overlaps the second area, controlling the sliding movement of the second housing so that the second housing slidably moves a distance corresponding to a difference between a center of the first area and a center of the touch area on an axis along which the second housing slidably moves.

In an embodiment of the disclosure, controlling the sliding movement of the second housing may include, based on identifying that at least the portion of the touch area overlaps the second area, identifying whether a size and/or a form of the touch area corresponds to a size and/or a form of a designated area. Controlling the sliding movement of the second housing may include, based on identifying that the size and/or the form of the touch area corresponds to the size and/or the form of the designated area, controlling the sliding movement of the second housing so that the second housing slidably moves a distance corresponding to a difference between a center of the first area and a center of the touch area on an axis along which the second housing slidably moves.

In an embodiment of the disclosure, the size and/or the form of the designated area may be stored in memory 430 of the electronic device 401 after the size and/or the form of the designated area is obtained using AI (artificial intelligence) model trained based on touch areas in which touch inputs have been obtained when an authentication has been performed using the fingerprint sensor 420.

In an embodiment of the disclosure, controlling the sliding movement of the second housing may include, based on the touch area not corresponding to the first area, controlling the sliding movement of the second housing so that a position of the first area corresponds to a position of a touch area which is being touched on the display 410.

In an embodiment of the disclosure, the method may further comprise, based on that the authentication performed based on the touch area corresponding to the first area is failed, and fingerprint information used for the authentication meets a designated condition, controlling the sliding movement of the second housing so that fingerprint information more than the fingerprint information used for the authentication is obtained.

In an embodiment of the disclosure, controlling the sliding movement of the second housing may further include, based on that the authentication performed after the sliding movement of the second housing is succeeded, control the second housing to slidably move to a position before the sliding movement of the second housing.

In an embodiment of the disclosure, the method may further comprise identifying a fourth area including the first area corresponding to the fingerprint sensor 420 and a third area in which fingerprint registration can be performed by slidably moving the second housing. The method may further comprise, based on at least a portion of the touch area touched by the user on the display 410 overlapping the fourth area, controlling the sliding movement of the second housing so that the fingerprint registration is performed using the fingerprint sensor 420.

In an embodiment of the disclosure, controlling the sliding movement of the second housing may include, based on at least the portion of the touch area touched by the user on the display 410 overlapping the fourth area, controlling the second housing to slidably move by a designated distance every designated time interval until the fingerprint registration is completed using the fingerprint sensor 420.

In an embodiment of the disclosure, in a non-transitory computer-readable medium storing computer-executable instructions, the computer-executable instructions may, when executed, cause an electronic device 401 including at least one processor 440 to perform authentication using a fingerprint sensor 420 based on a touch area touched by a user on a display 410 of the electronic device 401 corresponding to a first area corresponding to the fingerprint sensor 420 in the display 410, the electronic device 401 comprising a first housing, a second housing configured to slidably move relative to the first housing, the display 410, and the fingerprint sensor 420 configured to be moved by a sliding movement of the second housing, wherein a display area of the display 410, which is exposed to an outside of the electronic device 401, can be extended or reduced based on a sliding movement of the second housing. The computer-executable instructions may, when executed, cause the electronic device 401 including the at least one processor 440 to, based on the touch area not corresponding to the first area, control the sliding movement of the second housing so that the first area is located at a position where the authentication can be performed. The computer-executable instructions may, when executed, cause the electronic device 401 including the at least one processor 440 to perform the authentication based on the sliding movement of the second housing.

Further, the structure of the data used in embodiments of the disclosure may be recorded in a computer-readable recording medium via various means. The computer-readable recording medium includes a storage medium, such as magnetic storage medium (e.g., read only memory (ROM), floppy disc, or hard disc) or optical reading medium (e.g., CD-ROM or a digital versatile disc (DVD)).

What is claimed is:

1. An electronic device comprising:
   a first housing;
   a second housing configured to slidably move relative to the first housing;

a display, wherein a display area of the display, which is exposed to an outside of the electronic device, is extended or reduced based on a sliding movement of the second housing;

a fingerprint sensor configured to move together with the display by the sliding movement of the second housing;

memory, comprising one or more storage media, storing instructions; and one or more processors communicatively coupled to the display, the fingerprint sensor, and the memory, wherein the instructions, when executed by the one or more processors individually or collectively, cause the electronic device to:

when a touch area touched by a user on the display is not corresponding to a first area corresponding to an area in which the fingerprint sensor is located, control the sliding movement of the second housing based on a distance between the touch area and the first area, so that the first area is moved to a position where fingerprint information can be detected.

2. The electronic device of claim 1, wherein the instructions, when executed by the one or more processors individually or collectively, further cause the electronic device to:

based on the touch area not corresponding to the first area, identify whether at least a portion of the touch area overlaps a second area in which an authentication using the fingerprint sensor can be performed by slidably moving the second housing, and based on identifying that at least the portion of the touch area overlaps the second area, control the sliding movement of the second housing so that the second housing slidably moves a distance corresponding to a difference between a center of the first area and a center of the touch area on an axis along which the second housing slidably moves.

3. The electronic device of claim 2, wherein the instructions, when executed by the one or more processors individually or collectively, further cause the electronic device to:

based on identifying that at least the portion of the touch area overlaps the second area, identify whether a size and/or a form of the touch area corresponds to a size and/or a form of a designated area, and based on identifying that the size and/or the form of the touch area corresponds to the size and/or the form of the designated area, control the sliding movement of the second housing so that the second housing slidably moves the distance corresponding to the difference between the center of the first area and the center of the touch area on the axis along which the second housing slidably moves.

4. The electronic device of claim 3, wherein the size and/or the form of the designated area is stored in the memory after the size and/or the form of the designated area is obtained by using an artificial intelligence (AI) model trained based on touch areas in which touch inputs have been obtained when an authentication has been performed using the fingerprint sensor.

5. The electronic device of claim 1, wherein the instructions, when executed by the one or more processors individually or collectively, further cause the electronic device to:

based on the touch area not corresponding to the first area, control the sliding movement of the second housing so that a position of the first area corresponds to a position of a the touch area which is being touched by the user on the display.

6. The electronic device of claim 1, wherein the instructions, when executed by the one or more processors individually or collectively, further cause the electronic device to:

based on an authentication performed based on the touch area corresponding to the first area failing, and fingerprint information used for the authentication meeting a designated condition, control the sliding movement of the second housing so that additional fingerprint information more than the fingerprint information used for the authentication is obtained.

7. The electronic device of claim 6, wherein the instructions, when executed by the one or more processors individually or collectively, further cause the electronic device to:

based on the authentication performed after the controlling of the sliding movement of the second housing succeeding, control the second housing to slidably move to a position before the controlling of the sliding movement of the second housing.

8. The electronic device of claim 1, wherein the instructions, when executed by the one or more processors individually or collectively, further cause the electronic device to:

identify a third area including the first area corresponding to the fingerprint sensor and a second area in which fingerprint registration can be performed by slidably moving the second housing, and based on at least a portion of the touch area touched by the user on the display overlapping the third area, control the sliding movement of the second housing so that the fingerprint registration is performed using the fingerprint sensor.

9. The electronic device of claim 8, wherein the instructions, when executed by the one or more processors individually or collectively, further cause the electronic device to:

based on at least the portion of the touch area touched by the user on the display overlapping the third area, control the second housing to slidably move a designated distance every designated time interval until the fingerprint registration is completed using the fingerprint sensor.

10. The electronic device of claim 1, wherein the instructions, when executed by the one or more processors individually or collectively, further cause the electronic device to:

based on an authentication performed after the sliding movement of the second housing failing, display, through the display, information guiding the user to move a center of the touch area being touched by the user so that the center of the touch area faces a center of the first area.

11. A method performed by an electronic device including a first housing, a second housing configured to slidably move relative to the first housing, a display in which a display area of the display, which is exposed to an outside of the electronic device, is extended or reduced based on a sliding movement of the second housing, and a fingerprint sensor configured to move together with the display by the sliding movement of the second housing, the method comprising:

when a touch area touched by a user on the display is not corresponding to a first area corresponding to an area in which the fingerprint sensor is located, controlling, by the electronic device, the sliding movement of the second housing based on a distance between the touch area and the first area, so that the first area is moved to a position where fingerprint information can be detected.

12. The method of claim 11, wherein the controlling of the sliding movement of the second housing comprises:

based on the touch area not corresponding to the first area, identifying, by the electronic device, whether at least a portion of the touch area overlaps a second area in which an authentication using the fingerprint sensor can be performed by slidably moving the second housing; and based on identifying that at least the portion of the touch area overlaps the second area, controlling, by the electronic device, the sliding movement of the second housing so that the second housing slidably moves a distance corresponding to a difference between a center of the first area and a center of the touch area on an axis along which the second housing slidably moves.

13. The method of claim 12, wherein the controlling of the sliding movement of the second housing comprises:

based on identifying that at least the portion of the touch area overlaps the second area, identifying, by the electronic device, whether a size and/or a form of the touch area corresponds to a size and/or a form of a designated area; and based on identifying that the size and/or the form of the touch area corresponds to the size and/or the form of the designated area, controlling, by the electronic device, the sliding movement of the second housing so that the second housing slidably moves the distance corresponding to the difference between the center of the first area and the center of the touch area on the axis along which the second housing slidably moves.

14. The method of claim 13, wherein the size and/or the form of the designated area is stored in memory of the electronic device after the size and/or the form of the designated area is obtained using an artificial intelligence (AI) model trained based on touch areas in which touch inputs have been obtained when an authentication has been performed using the fingerprint sensor.

15. The method of claim 11, wherein the controlling of the sliding movement of the second housing comprises:

based on the touch area not corresponding to the first area, controlling, by the electronic device, the sliding movement of the second housing so that a position of the first area corresponds to a position of the touch area which is being touched by the user on the display.

16. The method of claim 11, further comprising based on an authentication performed based on the touch area corresponding to the first area failing, and fingerprint information used for the authentication meeting a designated condition, controlling, by the electronic device, the sliding movement of the second housing so that additional fingerprint information more than the fingerprint information used for the authentication is obtained.

17. The method of claim 16, wherein the controlling of the sliding movement of the second housing further comprises:

based on the authentication performed after the controlling of the sliding movement of the second housing succeeding, controlling, by the electronic device, the second housing to slidably move to a position before the controlling of the sliding movement of the second housing.

18. The method of claim 11, further comprising:

identifying, by the electronic device, a third area including the first area corresponding to the fingerprint sensor and a second area in which fingerprint registration can be performed by slidably moving the second housing; and based on at least a portion of the touch area touched by the user on the display overlapping the third area, controlling, by the electronic device, the sliding movement of the second housing so that the fingerprint registration is performed using the fingerprint sensor.

19. The method of claim 18, wherein the controlling of the sliding movement of the second housing comprises:

based on at least the portion of the touch area touched by the user on the display overlapping the third area, controlling, by the electronic device, the second housing to slidably move by a designated distance every designated time interval until the fingerprint registration is completed using the fingerprint sensor.

20. One or more non-transitory computer-readable storage media storing computer-executable instructions that, when executed by one or more processors of an electronic device individually or collectively in which the electronic device includes a first housing, a second housing configured to slidably move relative to the first housing, a display in which a display area of the display, which is exposed to an outside of the electronic device, is extended or reduced based on a sliding movement of the second housing, and a fingerprint sensor configured to move together with the display by the sliding movement of the second housing, cause the electronic device to perform operations, the operations comprising:

when a touch area touched by a user on the display is not corresponding to a first area corresponding to an area in which the fingerprint sensor is located, controlling, by the electronic device, the sliding movement of the second housing based on a distance between the touch area and the first area, so that the first area is moved to a position where fingerprint information can be detected.

* * * * *